United States Patent
Li et al.

(10) Patent No.: US 12,435,104 B2
(45) Date of Patent: Oct. 7, 2025

(54) CYCLIC DINUCLEOTIDES AS STING AGONISTS

(71) Applicant: BEIGENE, LTD., Grand Cayman (KY)

(72) Inventors: Jing Li, Beijing (CN); Zhiwei Wang, Beijing (CN); Lina Gu, Beijing (CN); Sanjia Xu, Beijing (CN)

(73) Assignee: BeiGene, Ltd., Grand Cayman (KY)

( * ) Notice: Subject to any disclaimer, the term of this patent is extended or adjusted under 35 U.S.C. 154(b) by 848 days.

(21) Appl. No.: 17/629,466

(22) PCT Filed: Jul. 24, 2020

(86) PCT No.: PCT/CN2020/103987
§ 371 (c)(1),
(2) Date: Jan. 24, 2022

(87) PCT Pub. No.: WO2021/013234
PCT Pub. Date: Jan. 28, 2021

(65) Prior Publication Data
US 2022/0251135 A1    Aug. 11, 2022

(30) Foreign Application Priority Data

Jul. 25, 2019 (WO) ................ PCT/CN2019/097644

(51) Int. Cl.
*C07H 21/02* (2006.01)
(52) U.S. Cl.
CPC .................................. *C07H 21/02* (2013.01)
(58) Field of Classification Search
CPC ........................................................ C07H 21/02
USPC .......................................................... 514/27
See application file for complete search history.

(56) References Cited

U.S. PATENT DOCUMENTS

| | | |
|---|---|---|
| 2015/0343056 A1 | 12/2015 | Chen et al. |
| 2017/0296655 A1 | 10/2017 | Chen et al. |
| 2018/0064745 A1 | 3/2018 | Katibah et al. |
| 2019/0263851 A1 | 8/2019 | Chen et al. |
| 2020/0102342 A1 | 4/2020 | Chen et al. |
| 2020/0140477 A1 | 5/2020 | Chen et al. |
| 2020/0179431 A1 | 6/2020 | Katibah et al. |
| 2020/0308216 A1 | 10/2020 | Chen et al. |

FOREIGN PATENT DOCUMENTS

| | | | |
|---|---|---|---|
| CN | 105120902 A | 12/2015 | |
| CN | 107530415 A | 1/2018 | |
| EP | 3505527 A1 | 7/2019 | |
| WO | WO 01/60315 | * | 8/2001 |
| WO | WO-2014099824 A1 | 6/2014 | |
| WO | WO-2014189805 A1 | 11/2014 | |
| WO | WO-2015077354 A1 | 5/2015 | |
| WO | WO-2016096174 A1 | 6/2016 | |
| WO | WO-2016145102 A1 | 9/2016 | |
| WO | WO 2017/027646 | * | 2/2017 |
| WO | WO-2017175147 A1 | 10/2017 | |
| WO | WO-2017175156 A1 | 10/2017 | |
| WO | WO-2019023459 A1 | 1/2019 | |
| WO | WO-2019046498 A1 | 3/2019 | |
| WO | WO-2019046500 A1 | 3/2019 | |
| WO | WO-2019074887 A1 | 4/2019 | |
| WO | WO-2019079261 A1 | 4/2019 | |
| WO | WO-2019227007 A1 | 11/2019 | |
| WO | WO-2020028565 A1 | 2/2020 | |
| WO | WO-2020146237 A1 | 7/2020 | |
| WO | WO-2021013234 A1 | 1/2021 | |
| WO | WO-2021068866 A1 | 4/2021 | |

OTHER PUBLICATIONS

Rapp et al. Reactions of trimethylsilyl fluorosulfonyldifluoroacetate with purine and pyrimidine nucleosides. Journal of Fluorine Chemistry 130 (2009) 321-328. (Year: 2009).*
Crow, Y. J. et al., "Mutations in the gene encoding the 3'-5' DNA exonuclease TREX1 cause Aicardi-Goutières syndrome at the AGS1 locus," Nat. Genet., Aug. 2006, vol. 38, No. 8, pp. 917-920.
Diner, E. J. et al., "The Innate Immune DNA Sensor cGAS Produces a Noncanonical Cyclic Dinucleotide that Activates Human STING," Cell Reports, vol. 3, No. 5, May 2013, pp. 1355-1361.
International Search Report and Written Opinion for International Application No. PCT/CN2020/103987, mailed Oct. 27, 2020, 12 pages.
International Search Report and Written Opinion for International Application No. PCT/CN2020/119871, mailed Jan. 11, 2021, 13 pages.
Lochmuller, C. H. et al., "Chromatographic resolution of enantiomers selective review," J. Chromatogr., vol. 113, No. 3, Oct. 1975, pp. 283-302.
Stetson, D. B. et al., "Trex1 prevents cell-intrinsic initiation of autoimmunity," Cell, vol. 134, No. 4, Aug. 2008, pp. 587-598.
Zhang, X. et al., "Cyclic GMP-AMP Containing Mixed Phosphodiester Linkages Is An Endogenous High-Affinity Ligand for STING," Molecular Cell, vol. 51, No. 2, Jul. 2013, pp. 226-235.

* cited by examiner

*Primary Examiner* — Yih-Horng Shiao
(74) *Attorney, Agent, or Firm* — McNeill PLLC

(57) ABSTRACT

Disclosed herein are cyclic di-nucleotide compounds and derivatives thereof that may be useful as STING agonists, and a pharmaceutical composition comprising the same. Also disclosed herein is the process for synthesis and to uses of such cyclic di-nucleotide compounds in various diseases including cancer, HIV infection and HBV infection.

15 Claims, No Drawings

CYCLIC DINUCLEOTIDES AS STING AGONISTS

CROSS-REFERENCE TO RELATED APPLICATIONS

This application is a U.S. National Stage Application under 35 U.S.C. § 371 of International Application No. PCT/CN2020/103987, filed Jul. 24, 2020, which claims priority to Patent Application No. PCT/CN2019/097644 (CN), filed on Jul. 25, 2019.

FIELD OF THE INVENTION

The present disclosure relates to cyclic dinucleotides and derivatives thereof that may be useful as STING agonists. The present disclosure also relates to a process for synthesis and to uses of such cyclic dinucleotides in various diseases including cancer, HIV infection and HBV infection.

BACKGROUND OF THE INVENTION

The innate immune system is specialized to act quickly against different danger signals. It provides the first line of defense against bacteria, viruses, parasites and other infectious threats by the production of soluble bioactive molecules such as cytokines or chemokines. By responding to these damage-associated molecular patterns (DAMPs) or pathogen-associated molecular patterns (PAMPs) described above, the innate immune system is able to provide protection against a wide range of threat to the host.

It has recently been demonstrated that the main sensor for cytosolic DNA is the cyclic GMP-AMP synthase (cGAS). cGAS catalyzes the generation of the cyclic dinucleotide 2',3'-cGAMP, an atypical second messenger that strongly binds to the ER-transmembrane adaptor protein STING (STimulator of INterferon Genes). A conformational change by cGAMP-bound STING translocates to a perinuclear compartment and induces the activation of critical transcription factors IRF-3 and NF-kB. This leads to a strong induction of type I interferons and production of pro-inflammatory cytokines such as IL-6, TNF-alpha and IFN-gamma.

The type I interferons and pro-inflammatory cytokines can strongly potentiate T cell activation by enhancing the ability of dendritic cells and macrophages to uptake, process, present and cross-present antigens to T cells. Compounds that can induce type I interferon production are used in vaccines, where they act as adjuvants, enhancing specific immune responses to antigens. Compounds that can induce interferon production have potential use in the treatment of human cancers. Expanding contemporary data demonstrated that the development of STING activating agents is playing an important role in immuno-oncology.

As STING modulators, WO2014/189805A1 discloses cyclic purine dinucleotides that induce STING-dependent type I interferon production; WO2016/096174A1 discloses fluorinated cyclic dinucleotides for cytokine induction; and WO2019/023459A1, WO2019/046498A1, WO2019/046500A1, WO2019/074887A1 and WO2019/079261A1 also provide cyclic dinucleotides.

However, there is a demand of other small molecule STING agonists.

SUMMARY OF THE INVENTION

In the first embodiment, disclosed herein is a compound of Formula (I) as STING agonist. The first embodiment comprises the following aspects:

Aspect 1. A compound of Formula (I):

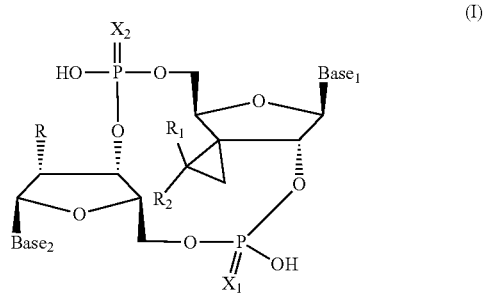

(I)

or a stereoisomer thereof, or a pharmaceutically acceptable salt thereof, wherein:

R is selected from hydrogen, halogen, —$C_{1-8}$alkyl, —$C_{2-8}$alkenyl, —$C_{2-8}$alkynyl, cycloalkyl, heterocyclyl, aryl, heteroaryl, —CN, —$NO_2$, —$OR^a$, —$SO_2R^a$, —$COR^a$, —$CO_2R^a$, —$CONR^aR^b$, —$C(=NR^a)NR^bR^c$, —$NR^aR^b$, —$NR^aCOR^b$, —$NR^aCONR^bR^c$, —$NR^aCO_2R^b$, —$NR^aSONR^bR^c$, —$NR^aSO_2NR^bR^c$, or —$NR^aSO_2R^b$, each of said —$C_{1-8}$alkyl, —$C_{2-8}$alkenyl, —$C_{2-8}$alkynyl, cycloalkyl, heterocyclyl, aryl, or heteroaryl is optionally substituted with halogen, hydroxy, —$C_{1-8}$alkyoxy, cycloalkyl, heterocyclyl, aryl, or heteroaryl;

$R_1$ and $R_2$, which may be the same or different, are each independently selected from hydrogen, halogen, —$C_{1-8}$ alkyl, —$C_{2-8}$alkenyl, —$C_{2-8}$alkynyl, cycloalkyl, heterocyclyl, aryl, heteroaryl, —CN, —$NO_2$, —$OR^a$, —$SO_2R^a$, —$COR^a$, —$CO_2R^a$, —$CONR^aR^b$, —$C(=NR^a)NR^bR^c$, —$NR^aR^b$, —$NR^aCOR^b$, —$NR^a$-$CONR^bR^c$, —$NR^aCO_2R^b$, —$NR^aSONR^bR^c$, —$NR^aSO_2NR^bR^c$, or —$NR^aSO_2R^b$, each of said —$C_{1-8}$ alkyl, —$C_{2-8}$alkenyl, —$C_{2-8}$alkynyl, cycloalkyl, heterocyclyl, aryl, or heteroaryl is optionally substituted with halogen, hydroxy, —$C_{1-8}$alkyoxy, cycloalkyl, heterocyclyl, aryl, or heteroaryl;

or $R_1$ and $R_2$, together with the atom to which they are attached, form a 3- to 12-membered ring comprising 0, 1 or 2 heteroatom(s) independently selected from nitrogen, oxygen or optionally oxidized sulfur as ring member(s), said ring is optionally substituted with at least one substituent $R^d$;

$X_1$ and $X_2$, which may be the same or different, each are independently O or S;

$Base_1$ and $Base_2$, which may be the same or different, each are independently

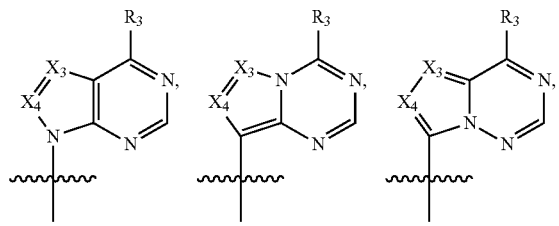

-continued

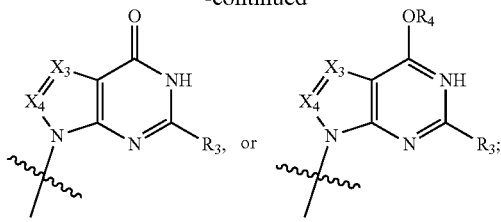

R₃ and R₄ are each independently hydrogen, —NR^aR^b, —OR^a, —C₁₋₈alkyl, —C₂₋₈alkenyl, or —C₂₋₈alkynyl (preferably

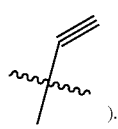 [SMILES: *C#C]

).

$X_3$ and $X_4$ are each independently CH or N;
$R^a$, $R^b$, $R^c$ and $R^d$ are each independently hydrogen, —C₁₋₈alkyl, —C₂₋₈alkenyl, —C₂₋₈alkynyl, cycloalkyl, heterocyclyl, aryl, or heteroaryl.

Aspect 2: The compound according to Aspect 1, wherein R is halogen, —C₁₋₈alkyl or —OR^a; R^a is hydrogen or —C₁₋₈alkyl,
or a stereoisomer thereof, or a pharmaceutically acceptable salt thereof.

Aspect 3: The compound according to Aspect 2, wherein R is halogen,
or a stereoisomer thereof, or a pharmaceutically acceptable salt thereof.

Aspect 4: The compound according to Aspect 3, wherein R is F, Cl, Br or I,
or a stereoisomer thereof, or a pharmaceutically acceptable salt thereof.

Aspect 5: The compound according to Aspect 2 or 4, wherein R is F or OH,
or a stereoisomer thereof, or a pharmaceutically acceptable salt thereof.

Aspect 6: The compound according to any one of Aspects 1-5, wherein $R_1$ and $R_2$, which may be the same or different, are each independently selected from hydrogen, halogen, —C₁₋₈alkyl or —OR^a; R^a is hydrogen or —C₁₋₈alkyl,
or a stereoisomer thereof, or a pharmaceutically acceptable salt thereof.

Aspect 7: The compound according to Aspect 6, wherein $R_1$ and $R_2$ are the same and selected from halogen,
or a stereoisomer thereof, or a pharmaceutically acceptable salt thereof.

Aspect 8: The compound according to Aspect 7, wherein $R_1$ and $R_2$ are the same and selected from F, Cl, Br or I,
or a stereoisomer thereof, or a pharmaceutically acceptable salt thereof.

Aspect 9: The compound according to Aspect 7, wherein $R_1$ and $R_2$ are F,
or a stereoisomer thereof, or a pharmaceutically acceptable salt thereof.

Aspect 10: The compound according to any one of Aspects 1-9, wherein $X_1=X_2=O$ or $X_1=X_2=S$,
or a stereoisomer thereof, or a pharmaceutically acceptable salt thereof.

Aspect 11: The compound according to any one of Aspects 1-10, wherein Base₁ and Base₂, which may be the same or different, each are independently

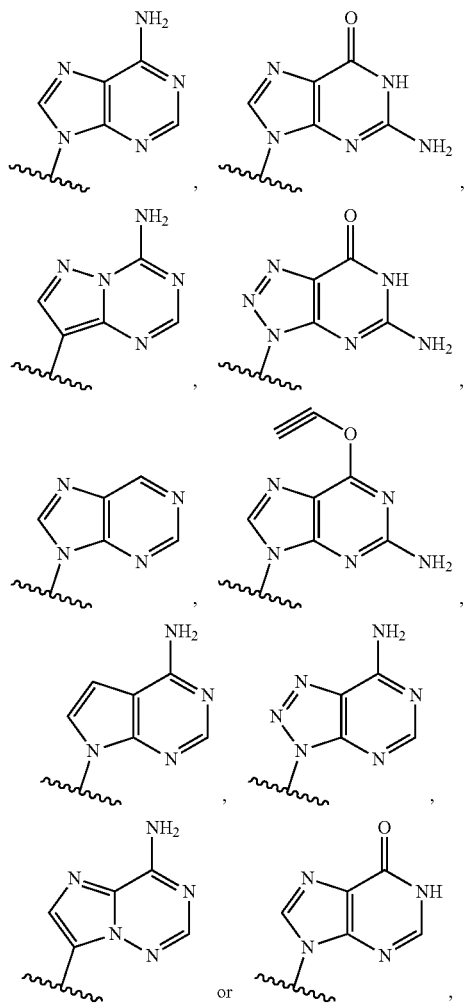

or a stereoisomer thereof, or a pharmaceutically acceptable salt thereof.

Aspect 12: The compound according to Aspect 11, wherein Base₁ is selected from

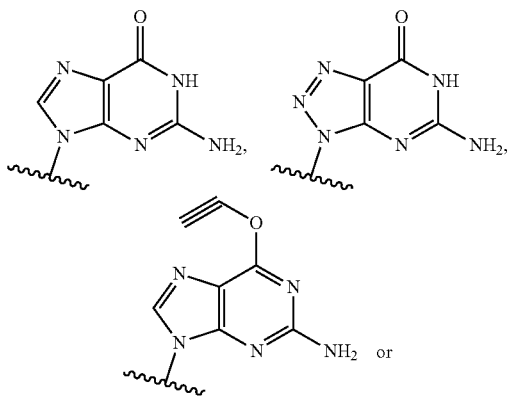

-continued

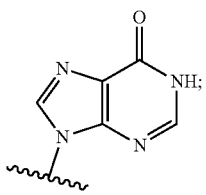

and

Base₂ is selected from

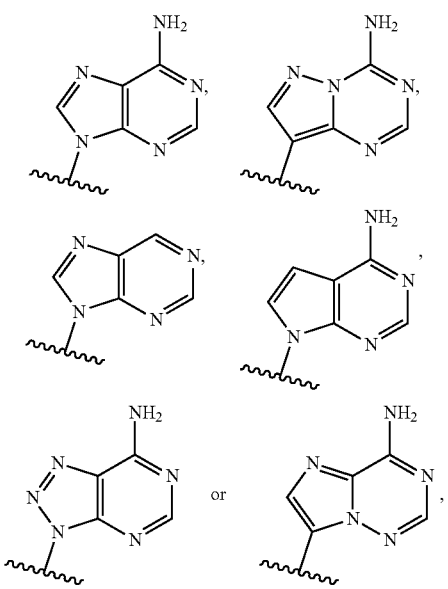

or a stereoisomer thereof, or a pharmaceutically acceptable salt thereof.

Aspect 13: The compound according to Aspect 11, wherein Base₁ is selected from

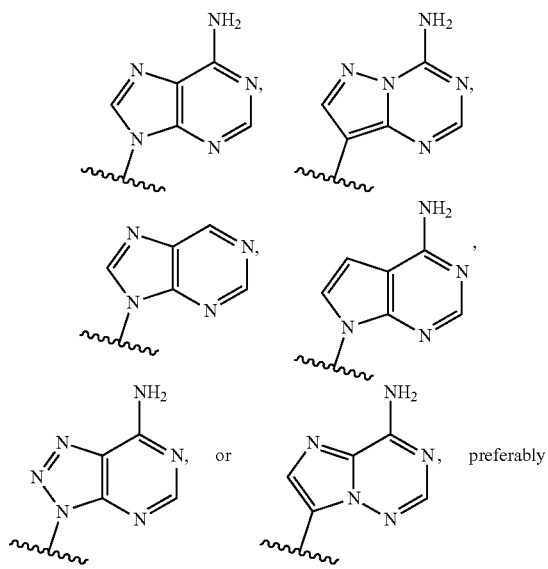

-continued

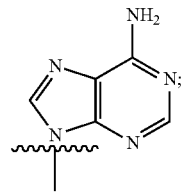

and

Base₂ is selected from

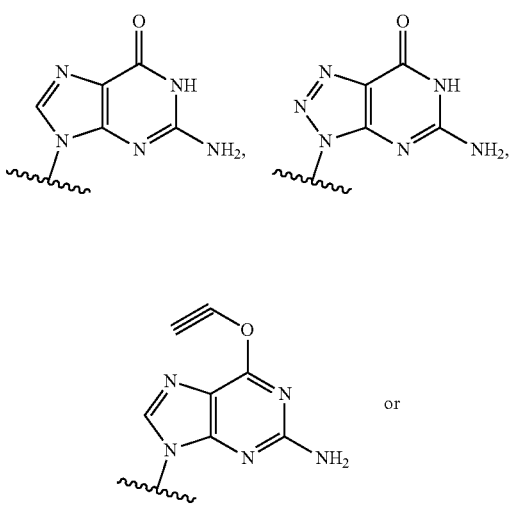

or a stereoisomer thereof, or a pharmaceutically acceptable salt thereof.

Aspect 14: The compound according to any one of Aspects 1-13, wherein Formula (I) is selected from Formula (Ia) and/or Formula (Ib)

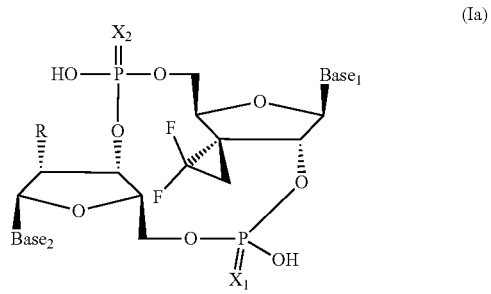

(Ia)

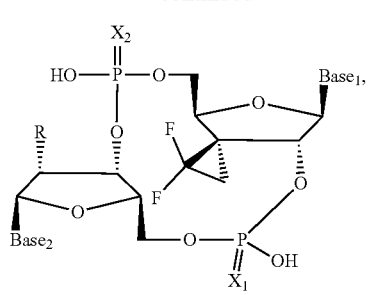
or a stereoisomer thereof, or a pharmaceutically acceptable salt thereof.
Aspect 15: The compound of Aspect 1, which is selected from
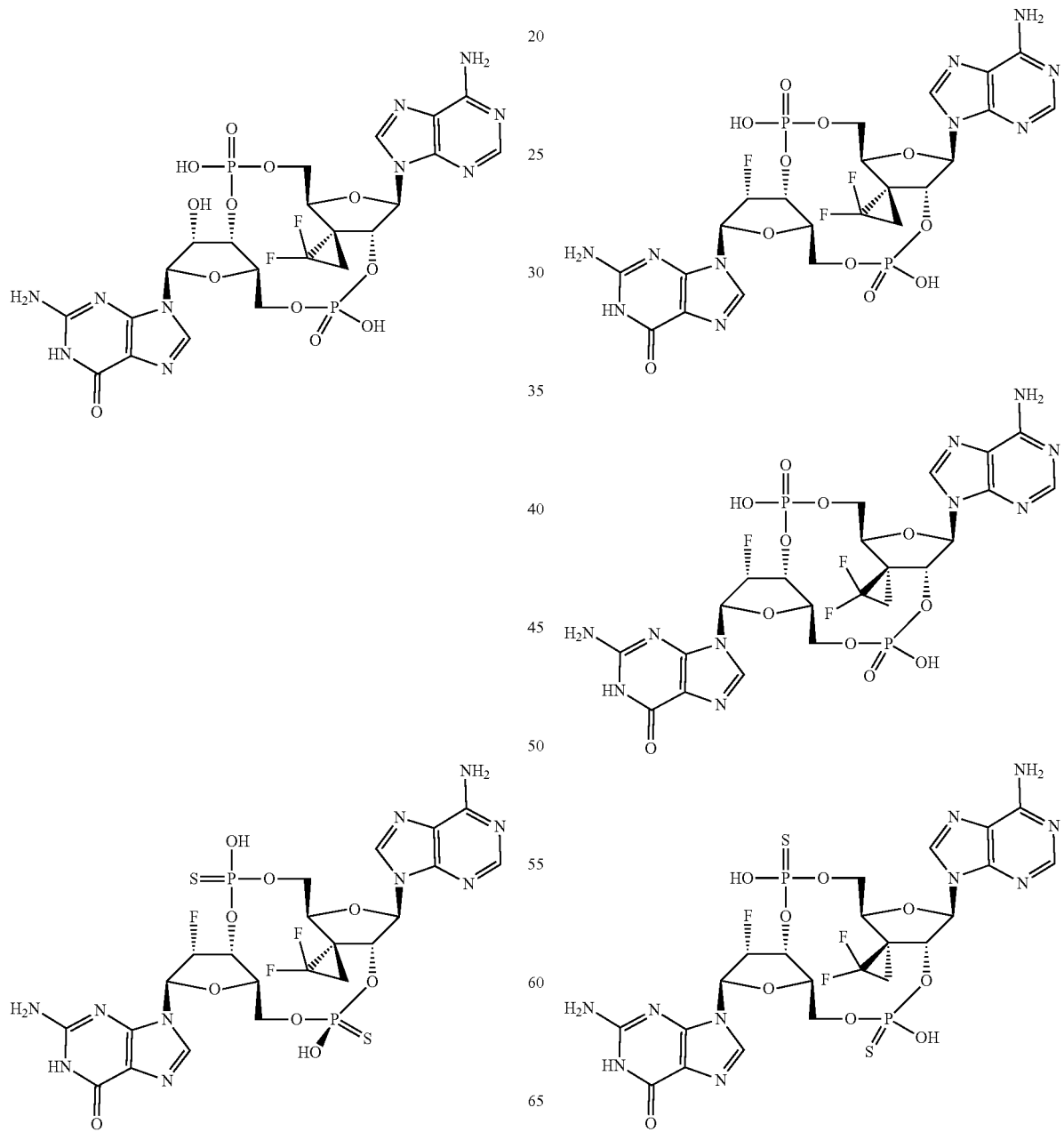

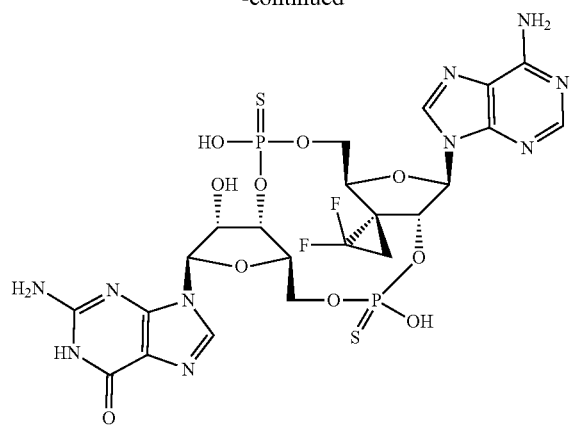
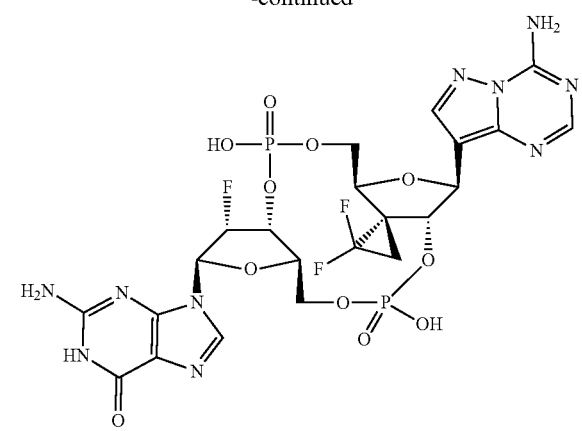
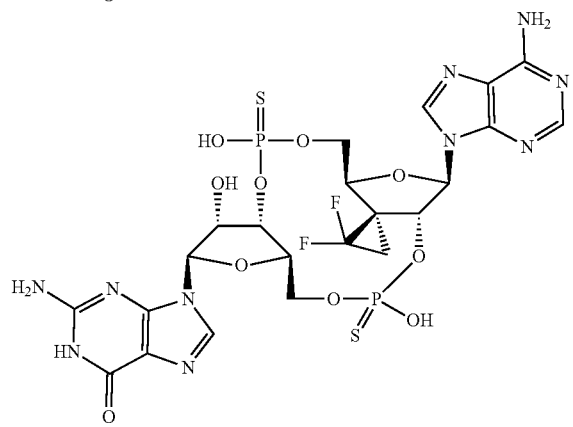
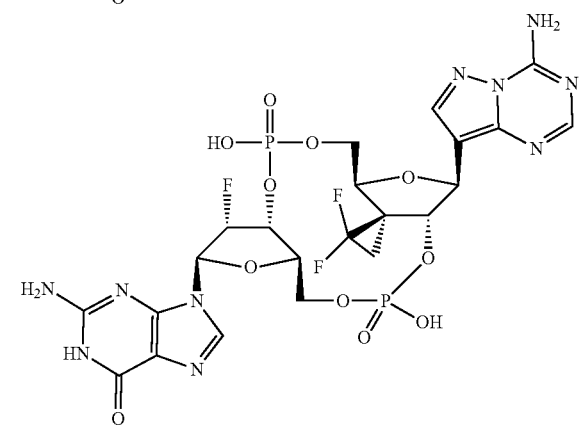
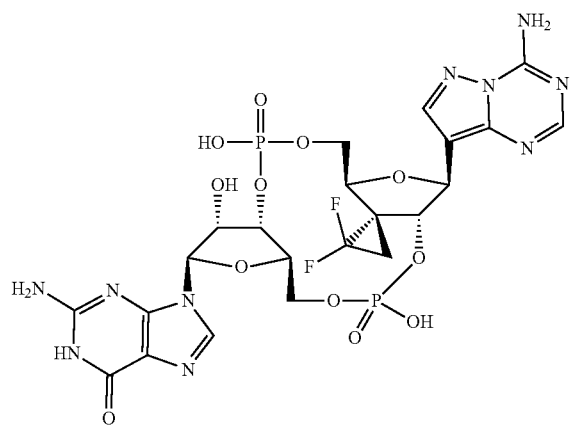
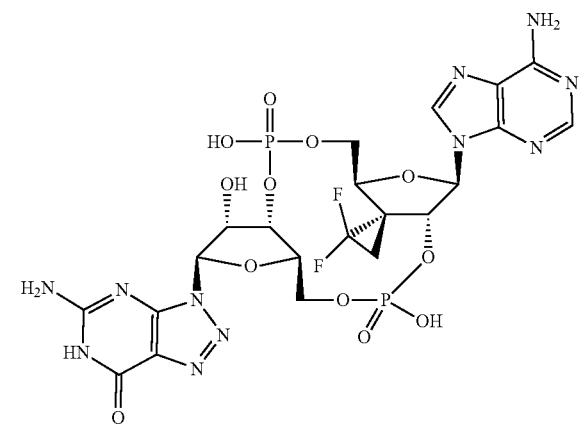
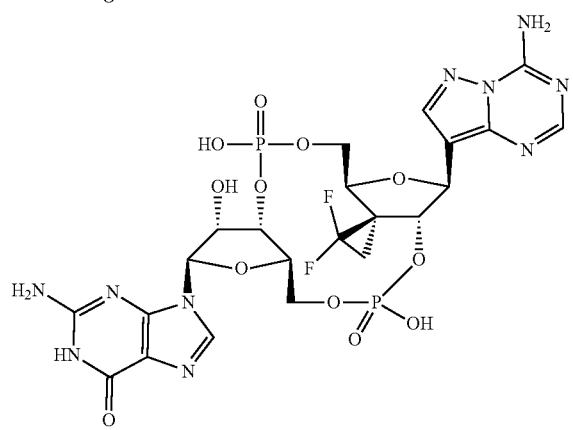
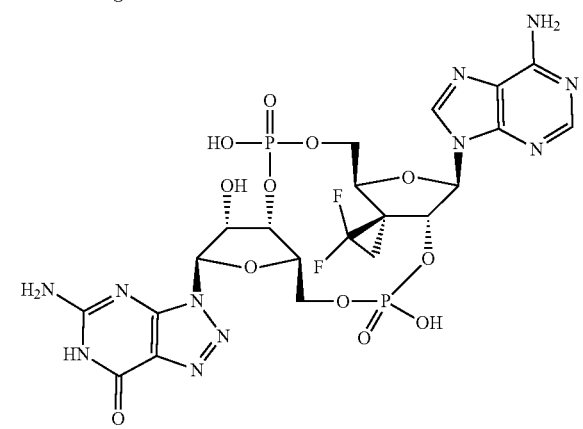

11
-continued
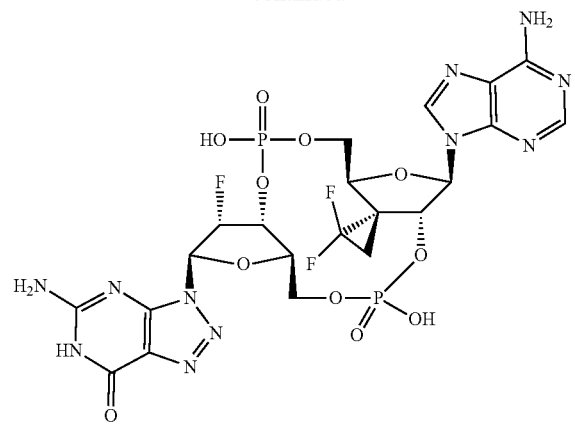
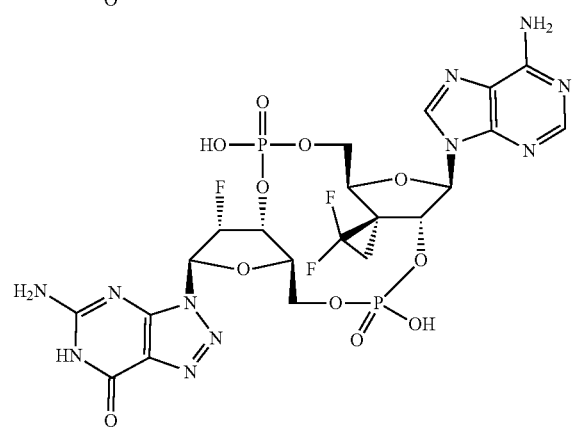
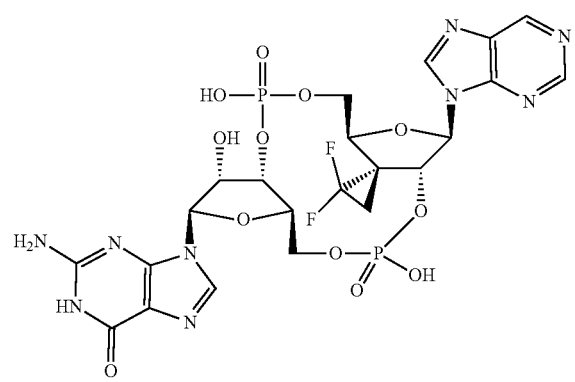
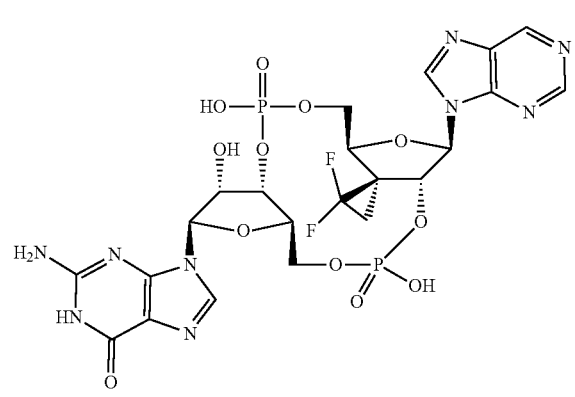
12
-continued
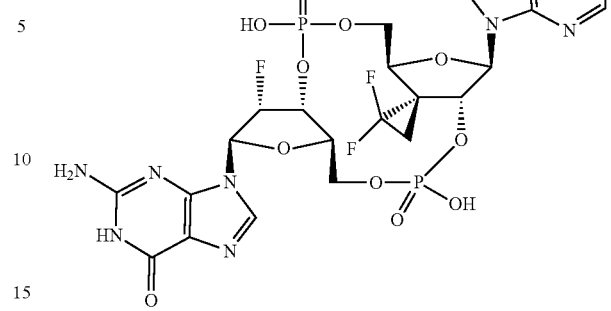
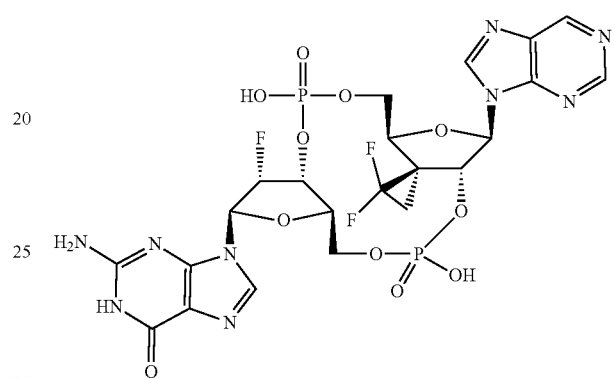
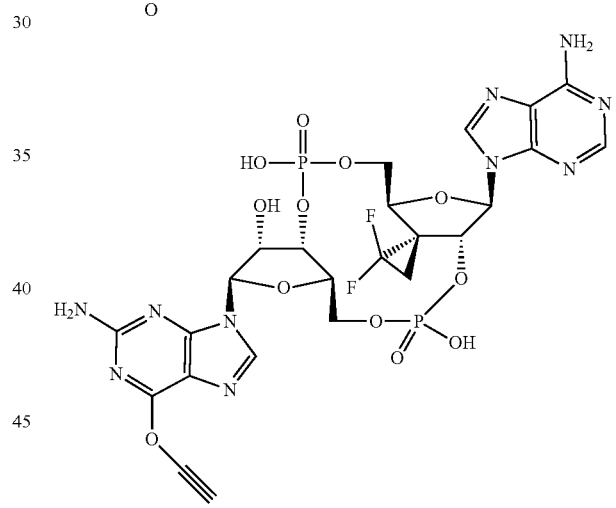
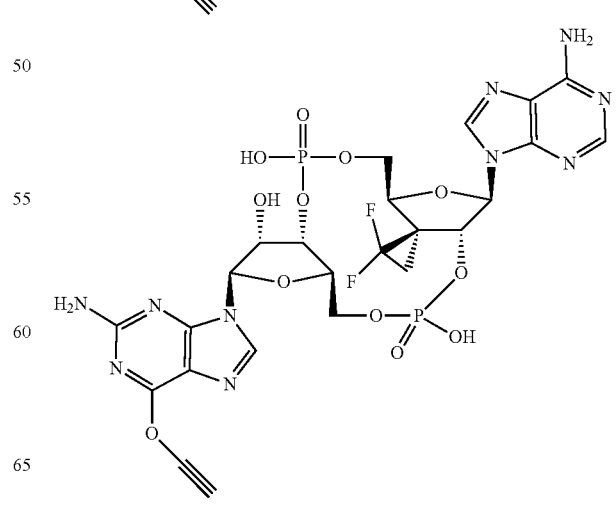

13
-continued
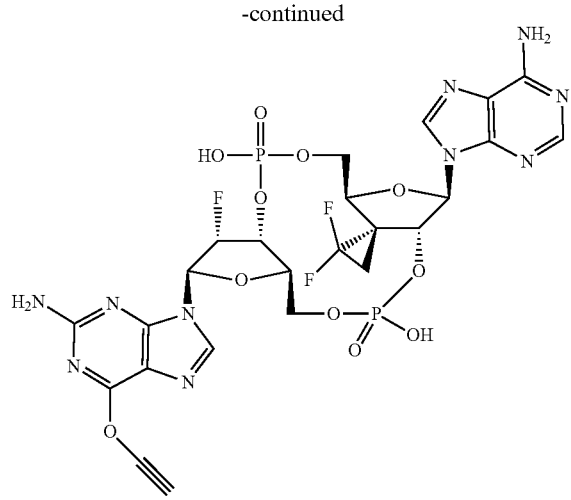
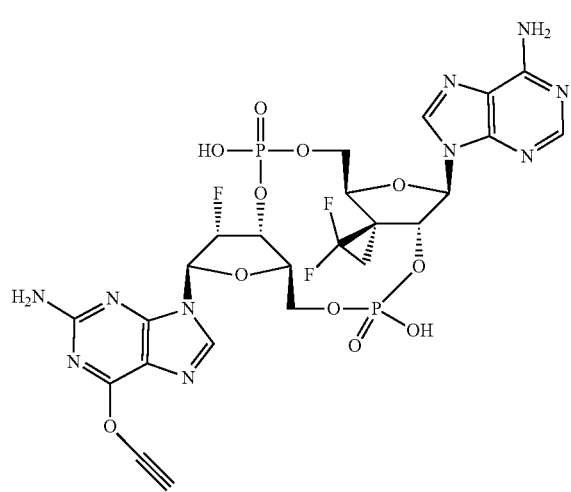
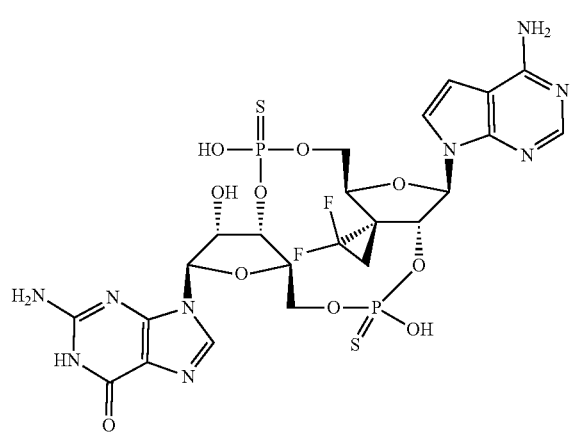
14
-continued
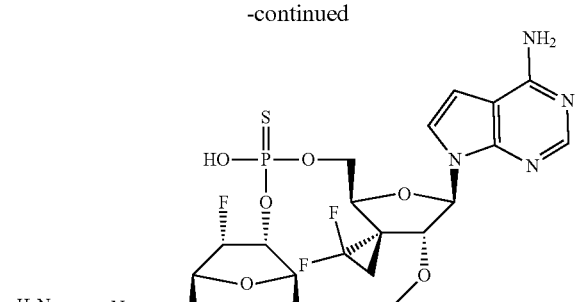
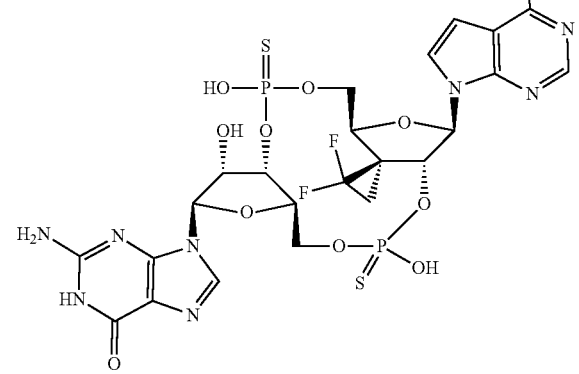
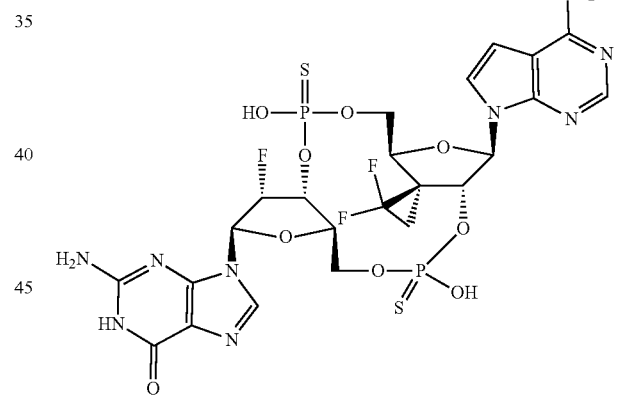
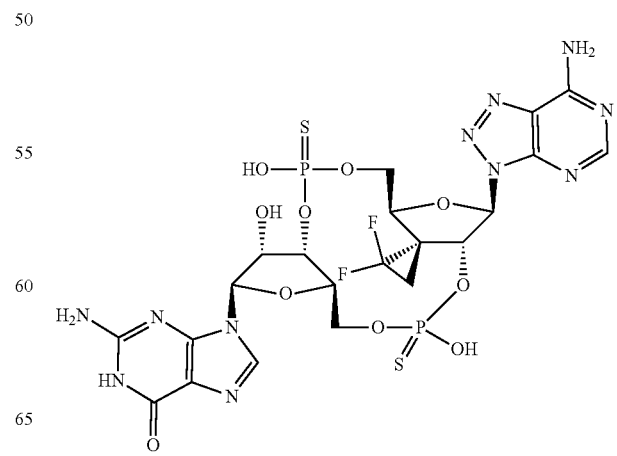

15
-continued
16
-continued
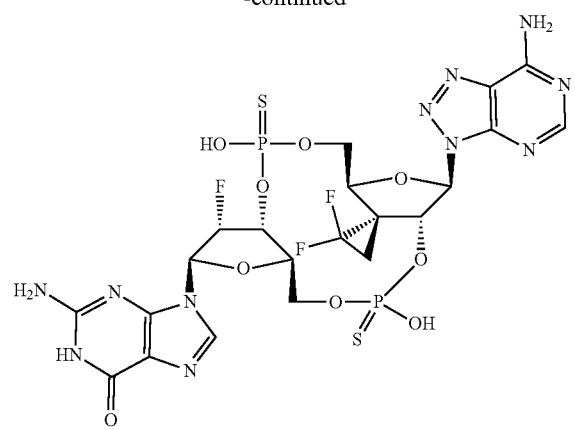
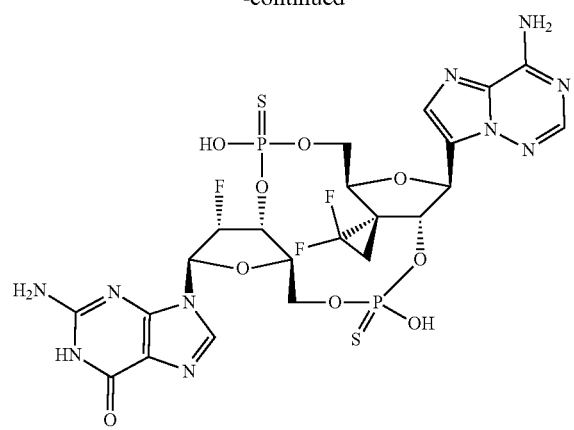

-continued
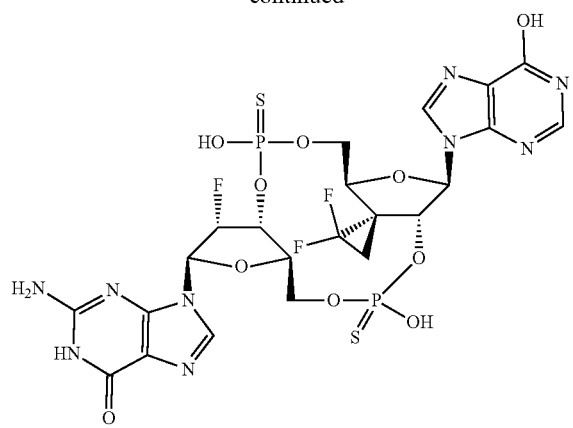
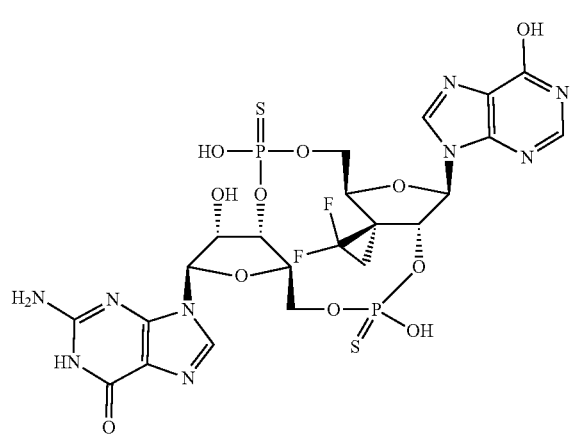
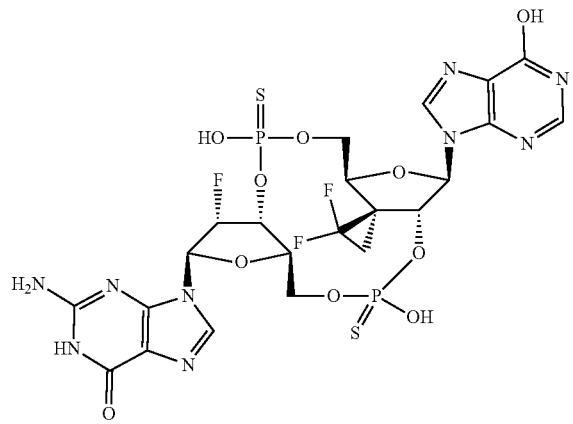
or a stereoisomer thereof, or a pharmaceutically acceptable salt thereof.
Aspect 16: The compound of Aspect 15, wherein Formula (I) is selected from
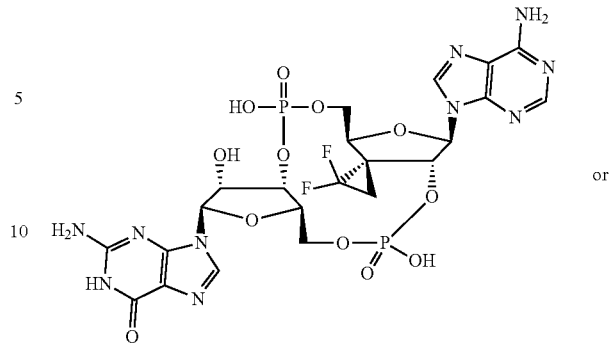
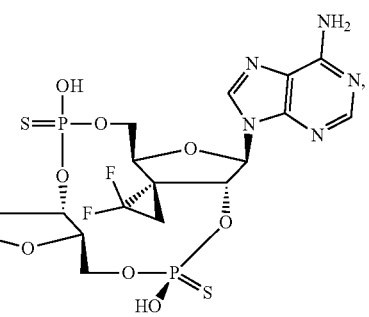
or a stereoisomer thereof, or a pharmaceutically acceptable salt thereof.
Aspect 17: The compound of Aspect 15, which is
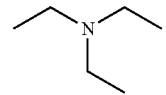
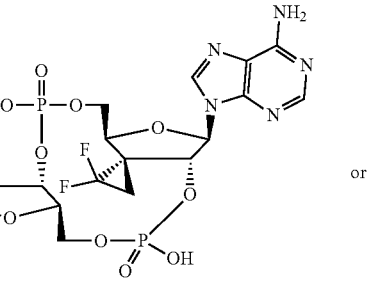
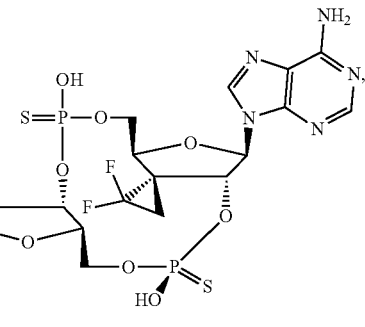
or a stereoisomer thereof.

In the second embodiment, disclosed herein is a pharmaceutical composition comprising the compound of any one of Aspects 1-17 or a stereoisomer thereof or a pharmaceutically acceptable salt thereof, optionally together with a pharmaceutically acceptable excipient.

In the third embodiment, disclosed herein is a method of treating cancer, HIV infection or HBV infection, comprising administering a subject in need thereof the compound of any one of Aspects 1-17 or a stereoisomer thereof, or a pharmaceutically acceptable salt thereof.

DETAILED DESCRIPTION OF THE INVENTION

The following terms have the indicated meanings throughout the specification:

Unless specifically defined elsewhere in this document, all other technical and scientific terms used herein have the meaning commonly understood by one of ordinary skill in the art to which this invention belongs.

The following terms have the indicated meanings throughout the specification:

As used herein, including the appended claims, the singular forms of words such as "a", "an", and "the", include their corresponding plural references unless the context clearly indicates otherwise.

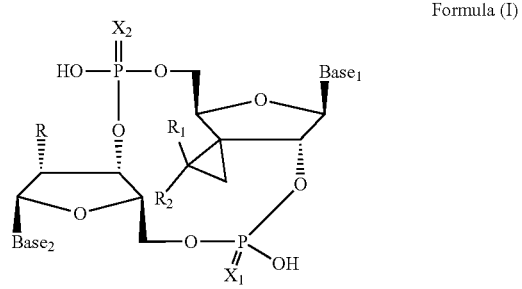

Formula (I)

includes different tautomers selected from

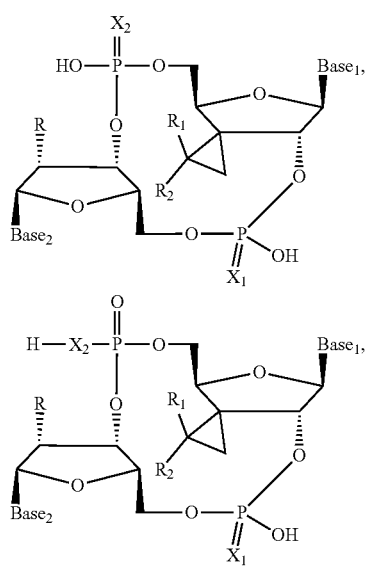

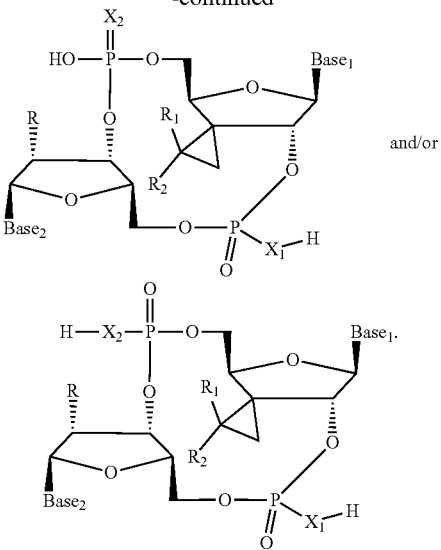

and/or

The term "or" is used to mean, and is used interchangeably with, the term "and/or" unless the context clearly dictates otherwise.

The term "alkyl" includes a hydrocarbon group selected from linear and branched, saturated hydrocarbon groups comprising from 1 to 18, such as from 1 to 12, further such as from 1 to 10, more further such as from 1 to 8, or from 1 to 6, or from 1 to 4, carbon atoms. Examples of alkyl groups comprising from 1 to 6 carbon atoms (i.e., $C_{1-6}$ alkyl) include, but not limited to, methyl, ethyl, 1-propyl or n-propyl ("n-Pr"), 2-propyl or isopropyl ("i-Pr"), 1-butyl or n-butyl ("n-Bu"), 2-methyl-1-propyl or isobutyl ("i-Bu"), 1-methylpropyl or s-butyl ("s-Bu"), 1,1-dimethylethyl or t-butyl ("t-Bu"), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl and 3,3-dimethyl-2-butyl groups.

The term "propyl" includes 1-propyl or n-propyl ("n-Pr"), 2-propyl or isopropyl ("i-Pr").

The term "butyl" includes 1-butyl or n-butyl ("n-Bu"), 2-methyl-1-propyl or isobutyl ("i-Bu"), 1-methylpropyl or s-butyl ("s-Bu"), 1,1-dimethylethyl or t-butyl ("t-Bu").

The term "pentyl" includes 1-pentyl, 2-pentyl, 3-pentyl, 2-methyl-2-butyl, 3-methyl-2-butyl, 3-methyl-1-butyl, 2-methyl-1-butyl.

The term "hexyl" includes 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl and 3,3-dimethyl-2-butyl.

The term "halogen" includes fluoro (F), chloro (Cl), bromo (Br) and iodo (I).

The term "haloalkyl" includes an alkyl group in which one or more hydrogen is/are replaced by one or more halogen atoms such as fluoro, chloro, bromo, and iodo. Examples of the haloalkyl include halo$C_{1-8}$alkyl, halo$C_{1-6}$ alkyl or halo $C_{1-4}$alkyl, but not limited to —CF$_3$, —CH$_2$Cl, —CH$_2$CF$_3$, —CHCl$_2$, —CF$_3$, and the like.

The term "alkenyl" includes a hydrocarbon group selected from linear and branched hydrocarbon groups comprising at least one C≡C double bond and from 2 to 18, such as from 2 to 8, further such as from 2 to 6, carbon atoms. Examples of the alkenyl group, e.g., $C_{2-6}$ alkenyl, include, but not limited to ethenyl or vinyl, prop-1-enyl, prop-2-enyl, 2-methylprop-1-enyl, but-1-enyl, but-2-enyl, but-3-enyl, buta-1,3-dienyl, 2-methylbuta-1,3-dienyl, hex-1-enyl, hex-2-enyl, hex-3-enyl, hex-4-enyl, and hexa-1,3-dienyl groups.

The term "alkynyl" includes a hydrocarbon group selected from linear and branched hydrocarbon group, comprising at least one C≡C triple bond and from 2 to 18, such as 2 to 8, further such as from 2 to 6, carbon atoms. Examples of the alkynyl group, e.g., $C_{2-6}$ alkynyl, include, but not limited to ethynyl, 1-propynyl, 2-propynyl (propargyl), 1-butynyl, 2-butynyl, and 3-butynyl groups.

The term "cycloalkyl" includes a hydrocarbon group selected from saturated cyclic hydrocarbon groups, comprising monocyclic and polycyclic (e.g., bicyclic and tricyclic) groups including fused, bridged or spiro cycloalkyl.

For example, the cycloalkyl group may comprise from 3 to 12, such as from 3 to 10, further such as 3 to 8, further such as 3 to 6, 3 to 5, or 3 to 4 carbon atoms. Even further for example, the cycloalkyl group may be selected from monocyclic group comprising from 3 to 12, such as from 3 to 10, further such as 3 to 8, 3 to 6 carbon atoms. Examples of the monocyclic cycloalkyl group include cyclopropyl, cyclobutyl, cyclopentyl, cyclohexyl, cycloheptyl, cyclooctyl, cyclononyl, cyclodecyl, cycloundecyl, and cyclododecyl groups. In particular, Examples of the saturated monocyclic cycloalkyl group, e.g., $C_{3-8}$cycloalkyl, include, but not limited to cyclopropyl, cyclobutyl, cyclopentyl, cyclohexyl, cycloheptyl, and cyclooctyl groups. In a preferred embedment, the cycloalkyl is a monocyclic ring comprising 3 to 6 carbon atoms (abbreviated as $C_{3-6}$ cycloalkyl), including but not limited to, cyclopropyl, cyclobutyl, cyclopentyl, and cyclohexyl. Examples of the bicyclic cycloalkyl groups include those having from 7 to 12 ring atoms arranged as a fused bicyclic ring selected from [4,4], [4,5], [5,5], [5,6] and [6,6] ring systems, or as a bridged bicyclic ring selected from bicyclo[2.2.1]heptane, bicyclo[2.2.2]octane, and bicyclo[3.2.2]nonane. Further Examples of the bicyclic cycloalkyl groups include those arranged as a bicyclic ring selected from [5,6] and [6,6] ring systems.

The term "spiro cycloalkyl" includes a cyclic structure which contains carbon atoms and is formed by at least two rings sharing one atom. The term "7 to 12 membered spiro cycloalkyl" includes a cyclic structure which contains 7 to 12 carbon atoms and is formed by at least two rings sharing one atom.

The term "fused cycloalkyl" includes a bicyclic cycloalkyl group as defined herein which is saturated and is formed by two or more rings sharing two adjacent atoms.

The term "bridged cycloalkyl" includes a cyclic structure which contains carbon atoms and is formed by two rings sharing two atoms which are not adjacent to each other. The term "7 to 10 membered bridged cycloalkyl" includes a cyclic structure which contains 7 to 12 carbon atoms and is formed by two rings sharing two atoms which are not adjacent to each other.

The term "cycloalkenyl" includes non-aromatic cyclic alkyl groups of from 3 to 10 carbon atoms having single or multiple rings and having at least one double bond and preferably from 1 to 2 double bonds. In one embodiment, the cycloalkenyl is cyclopentenyl or cyclohexenyl, 1-cyclopent-1-enyl, 1-cyclopent-2-enyl, 1-cyclopent-3-enyl, 1-cyclohex-1-enyl, 1-cyclohex-2-enyl, 1-cyclohex-3-enyl, cyclohexadienyl, preferably cyclohexenyl.

The term "fused cycloalkenyl" includes a bicyclic cycloalkyl group as defined herein which contain at least one double bond and is formed by two or more rings sharing two adjacent atoms.

The term "cycloalkynyl" includes non-aromatic cycloalkyl groups of from 5 to 10 carbon atoms having single or multiple rings and having at least one triple bond.

The term "fused cycloalkynyl" includes a bicyclic cycloalkyl group as defined herein which contains at least one triple bond and is formed by two or more rings sharing two adjacent atoms.

Examples of fused cycloalkyl, fused cycloalkenyl, or fused cycloalkynyl include but are not limited to bicyclo[1.1.0]butyl, bicyclo[2.1.0]pentyl, bicyclo[3.1.0]hexyl, bicyclo[4.1.0]heptyl, bicyclo[3.3.0]octyl, bicyclo[4.2.0]octyl, decalin, as well as benzo 3 to 8 membered cycloalkyl, benzo $C_{4-6}$ cycloalkenyl, 2,3-dihydro-1H-indenyl, 1H-indenyl, 1, 2, 3,4-tetralyl, 1,4-dihydronaphthyl, etc. Preferred embodiments are 8 to 9 membered fused ring, which refer to cyclic structures containing 8 to 9 ring atoms within the above examples.

The term "aryl" used alone or in combination with other terms includes a group selected from:
a) 5- and 6-membered carbocyclic aromatic rings, e.g., phenyl;
b) bicyclic ring systems such as 7 to 12 membered bicyclic ring systems, wherein at least one ring is carbocyclic and aromatic, e.g., naphthyl and indanyl; and,
c) tricyclic ring systems such as 10 to 15 membered tricyclic ring systems wherein at least one ring is carbocyclic and aromatic, e.g., fluorenyl.

The terms "aromatic hydrocarbon ring" and "aryl" are used interchangeably throughout the disclosure herein. In some embodiments, a monocyclic or bicyclic aromatic hydrocarbon ring has 5 to 10 ring-forming carbon atoms (i.e., $C_{5-10}$ aryl). Examples of a monocyclic or bicyclic aromatic hydrocarbon ring includes, but not limited to, phenyl, naphth-1-yl, naphth-2-yl, anthracenyl, phenanthrenyl, and the like. In some embodiments, the aromatic hydrocarbon ring is a naphthalene ring (naphth-1-yl or naphth-2-yl) or phenyl ring. In some embodiments, the aromatic hydrocarbon ring is a phenyl ring.

Specifically, the term "bicyclic fused aryl" includes a bicyclic aryl ring as defined herein. The typical bicyclic fused aryl is naphthalene.

The term "heteroaryl" includes a group selected from:
a) 5-, 6- or 7-membered aromatic, monocyclic rings comprising at least one heteroatom, for example, from 1 to 4, or, in some embodiments, from 1 to 3, in some embodiments, from 1 to 2, heteroatoms, selected from nitrogen (N), sulfur (S) and oxygen (O), with the remaining ring atoms being carbon;
b) 7- to 12-membered bicyclic rings comprising at least one heteroatom, for example, from 1 to 4, or, in some embodiments, from 1 to 3, or, in other embodiments, 1 or 2, heteroatoms, selected from N, O, and S, with the remaining ring atoms being carbon and wherein at least one ring is aromatic and at least one heteroatom is present in the aromatic ring; and
c) 11- to 14-membered tricyclic rings comprising at least one heteroatom, for example, from 1 to 4, or in some embodiments, from 1 to 3, or, in other embodiments, 1 or 2, heteroatoms, selected from N, O, and S, with the remaining ring atoms being carbon and wherein at least one ring is aromatic and at least one heteroatom is present in an aromatic ring.

When the total number of S and O atoms in the heteroaryl group exceeds 1, those heteroatoms are not adjacent to one another. In some embodiments, the total number of S and O atoms in the heteroaryl group is not more than 2. In some embodiments, the total number of S and O atoms in the aromatic heterocycle is not more than 1. When the heteroaryl group contains more than one heteroatom ring member, the heteroatoms may be the same or different. The nitrogen atoms in the ring(s) of the heteroaryl group can be oxidized to form N-oxides.

Specifically, the term "bicyclic fused heteroaryl" includes a 7- to 12-membered, preferably 7- to 10-membered, more preferably 9- or 10-membered fused bicyclic heteroaryl ring as defined herein. Typically, a bicyclic fused heteroaryl is 5-membered/5-membered, 5-membered/6-membered, 6-membered/6-membered, or 6-membered/7-membered bicyclic. The group can be attached to the remainder of the molecule through either ring.

"Heterocyclyl", "heterocycle" or "heterocyclic" are interchangeable and include a non-aromatic heterocyclyl group comprising one or more heteroatoms selected from nitrogen, oxygen or optionally oxidized sulfur as ring members, with the remaining ring members being carbon, including monocyclic, fused, bridged, and spiro ring, i.e., containing monocyclic heterocyclyl, bridged heterocyclyl, spiro heterocyclyl, and fused heterocyclic groups.

The term "at least one substituent" disclosed herein includes, for example, from 1 to 4, such as from 1 to 3, further as 1 or 2, substituents, provided that the theory of valence is met. For example, "at least one substituent $R^{6d}$" disclosed herein includes from 1 to 4, such as from 1 to 3, further as 1 or 2, substituents selected from the list of $R^{6d}$ as disclosed herein.

The term "stereoisomer" refers to all isomers of individual compounds that differ only in the orientation of their atoms in space. The term stereoisomer includes mirror image isomers (enantiomers), mixtures of mirror image isomers (racemates, racemic mixtures), geometric (cis/trans or syn/anti or E/Z) isomers, and isomers of compounds with more than one chiral center that are not mirror images of one another (diastereoisomers).

The term "tautomer" refers to the coexistence of two (or more) compounds that differ from each other only in the position of one (or more) mobile atoms and in electron distribution, for example, keto-enol and imine-enamine tautomers.

Compounds disclosed herein may contain an asymmetric center and may thus exist as enantiomers. "Enantiomers" refer to two stereoisomers of a compound which are non-superimposable mirror images of one another. Where the compounds disclosed herein possess two or more asymmetric centers, they may additionally exist as diastereomers. Enantiomers and diastereomers fall within the broader class of stereoisomers. All such possible stereoisomers as substantially pure resolved enantiomers, racemic mixtures thereof, as well as mixtures of diastereomers are intended to be included. All stereoisomers of the compounds disclosed herein and/or pharmaceutically acceptable salts thereof are intended to be included. Unless specifically mentioned otherwise, reference to one isomer applies to any of the possible isomers. Whenever the isomeric composition is unspecified, all possible isomers are included.

The term "substantially pure" as used herein means that the target stereoisomer contains no more than 35%, such as no more than 30%, further such as no more than 25%, even further such as no more than 20%, by weight of any other stereoisomer(s). In some embodiments, the term "substantially pure" means that the target stereoisomer contains no more than 10%, for example, no more than 5%, such as no more than 1%, by weight of any other stereoisomer(s).

When compounds disclosed herein contain olefinic double bonds, unless specified otherwise, such double bonds are meant to include both E and Z geometric isomers.

When compounds disclosed herein contain a di-substituted cyclic ring system, substituents found on such ring system may adopt cis and trans formations. Cis formation means that both substituents are found on the upper side of the 2 substituent placements on the carbon, while trans would mean that they were on opposing sides. For example, the di-substituted cyclic ring system may be cyclohexyl or cyclobutyl ring.

It may be advantageous to separate reaction products from one another and/or from starting materials. The desired products of each step or series of steps is separated and/or purified (hereinafter separated) to the desired degree of homogeneity by the techniques common in the art. Typically such separations involve multiphase extraction, crystallization from a solvent or solvent mixture, distillation, sublimation, or chromatography. Chromatography can involve any number of methods including, for example: reverse-phase and normal phase; size exclusion; ion exchange; high, medium and low pressure liquid chromatography methods and apparatus; small scale analytical; simulated moving bed ("SMB") and preparative thin or thick layer chromatography, as well as techniques of small scale thin layer and flash chromatography. One skilled in the art could select and apply the techniques most likely to achieve the desired separation.

"Diastereomers" refer to stereoisomers of a compound with two or more chiral centers but which are not mirror images of one another. Diastereomeric mixtures can be separated into their individual diastereomers on the basis of their physical chemical differences by methods well known to those skilled in the art, such as by chromatography and/or fractional crystallization. Enantiomers can be separated by converting the enantiomeric mixture into a diastereomeric mixture by reaction with an appropriate optically active compound (e.g., chiral auxiliary such as a chiral alcohol or Mosher's acid chloride), separating the diastereomers and converting (e.g., hydrolyzing) the individual diastereoisomers to the corresponding pure enantiomers. Enantiomers can also be separated by use of a chiral HPLC column.

A single stereoisomer, e.g., a substantially pure enantiomer, may be obtained by resolution of the racemic mixture using a method such as formation of diastereomers using optically active resolving agents (Eliel, E. and Wilen, S. *Stereochemistry of Organic Compounds*. New York: John Wiley & Sons, Inc., 1994; Lochmuller, C. H., et al. "*Chromatographic resolution of enantiomers: Selective review.*" *J. Chromatogr.*, 113(3) (1975): pp. 283-302). Racemic mixtures of chiral compounds of the invention can be separated and isolated by any suitable method, including: (1) formation of ionic, diastereomeric salts with chiral compounds and separation by fractional crystallization or other methods, (2) formation of diastereomeric compounds with chiral derivatizing reagents, separation of the diastereomers, and conversion to the pure stereoisomers, and (3) separation of the substantially pure or enriched stereoisomers directly under chiral conditions. See: Wainer, Irving W., Ed. *Drug Stereochemistry: Analytical Methods and Pharmacology*. New York: Marcel Dekker, Inc., 1993.

"Pharmaceutically acceptable salts" refer to those salts which are, within the scope of sound medical judgment, suitable for use in contact with the tissues of humans and lower animals without undue toxicity, irritation, allergic response and the like, and are commensurate with a reasonable benefit/risk ratio. A pharmaceutically acceptable salt may be prepared in situ during the final isolation and purification of the compounds disclosed herein, or separately by reacting the free base function with a suitable organic acid or by reacting the acidic group with a suitable base.

In addition, if a compound disclosed herein is obtained as an acid addition salt, the free base can be obtained by basifying a solution of the acid salt. Conversely, if the product is a free base, an addition salt, such as a pharmaceutically acceptable addition salt, may be produced by dissolving the free base in a suitable organic solvent and treating the solution with an acid, in accordance with conventional procedures for preparing acid addition salts from base compounds. Those skilled in the art will recognize various synthetic methodologies that may be used without undue experimentation to prepare non-toxic pharmaceutically acceptable addition salts.

As defined herein, "a pharmaceutically acceptable salt thereof" include salts of at least one compound of Formula (I), and salts of the stereoisomers of the compound of Formula (I), such as salts of enantiomers, and/or salts of diastereomers.

The terms "administration", "administering", "treating" and "treatment" herein, when applied to an animal, human, experimental subject, cell, tissue, organ, or biological fluid, mean contact of an exogenous pharmaceutical, therapeutic, diagnostic agent, or composition to the animal, human, subject, cell, tissue, organ, or biological fluid. Treatment of a cell encompasses contact of a reagent to the cell, as well as contact of a reagent to a fluid, where the fluid is in contact with the cell. The term "administration" and "treatment" also means in vitro and ex vivo treatments, e.g., of a cell, by a reagent, diagnostic, binding compound, or by another cell. The term "subject" herein includes any organism, preferably an animal, more preferably a mammal (e.g., rat, mouse, dog, cat, and rabbit) and most preferably a human.

The term "effective amount" or "therapeutically effective amount" refers to an amount of the active ingredient, such as compound that, when administered to a subject for treating a disease, or at least one of the clinical symptoms of a disease or disorder, is sufficient to affect such treatment for the disease, disorder, or symptom. The term "therapeutically effective amount" can vary with the compound, the disease, disorder, and/or symptoms of the disease or disorder, severity of the disease, disorder, and/or symptoms of the disease or disorder, the age of the subject to be treated, and/or the weight of the subject to be treated. An appropriate amount in any given instance can be apparent to those skilled in the art or can be determined by routine experiments. In some embodiments, "therapeutically effective amount" is an amount of at least one compound and/or at least one stereoisomer thereof, and/or at least one pharmaceutically acceptable salt thereof disclosed herein effective to "treat" as defined herein, a disease or disorder in a subject. In the case of combination therapy, the term "therapeutically effective amount" refers to the total amount of the combination objects for the effective treatment of a disease, a disorder or a condition.

The term "disease" refers to any disease, discomfort, illness, symptoms or indications, and can be interchangeable with the term "disorder" or "condition".

Throughout this specification and the claims which follow, unless the context requires otherwise, the term "comprise", and variations such as "comprises" and "comprising" are intended to specify the presence of the features thereafter, but do not exclude the presence or addition of one or more other features. When used herein the term "comprising" can be substituted with the term "containing", "including" or sometimes "having".

Throughout this specification and the claims which follow, the term "$C_{n-m}$" indicates a range which includes the endpoints, wherein n and m are integers and indicate the number of carbons. Examples include $C_{1-8}$, $C_{1-6}$, and the like.

Unless specifically defined elsewhere in this document, all other technical and scientific terms used herein have the meaning commonly understood by one of ordinary skill in the art to which this invention belongs.

General Synthesis

Compounds disclosed herein, including salts thereof, can be prepared using known organic synthesis techniques and can be synthesized according to any of numerous possible synthetic routes.

The reaction for preparing compounds disclosed herein can be carried out in suitable solvents which can be readily selected by one of skill in the art of organic synthesis. Suitable solvents can be substantially non-reactive with the starting materials, the intermediates, or products at the temperatures at which the reactions are carried out, e.g., temperatures which can range from the solvent's boiling temperature. A given reaction can be carried out in one solvent or mixture of solvents.

The selection of appropriate protecting group, can be readily determined by one skilled in the art.

Reactions can be monitored according to any suitable method known in the art, such as NMR, UV, HPLC, LC-MS and TLC. Compounds can be purified by a variety of methods, including HPLC and normal phase silica chromatography.

Chiral analytic HPLC was used for the retention time analysis of different chiral examples, the conditions were divided into the methods as below according to the column, mobile phase, solvent ratio used.

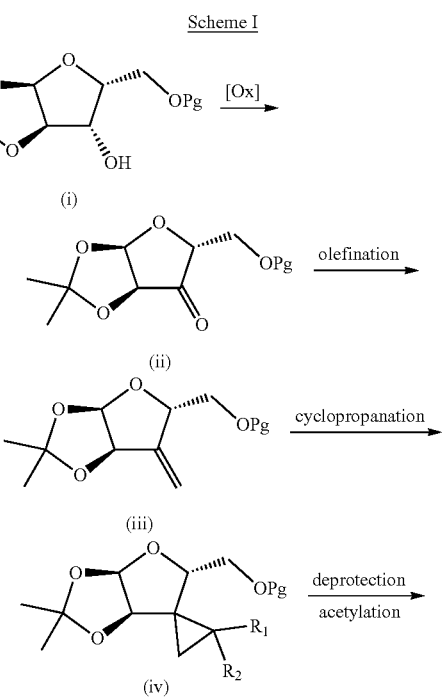

Scheme I

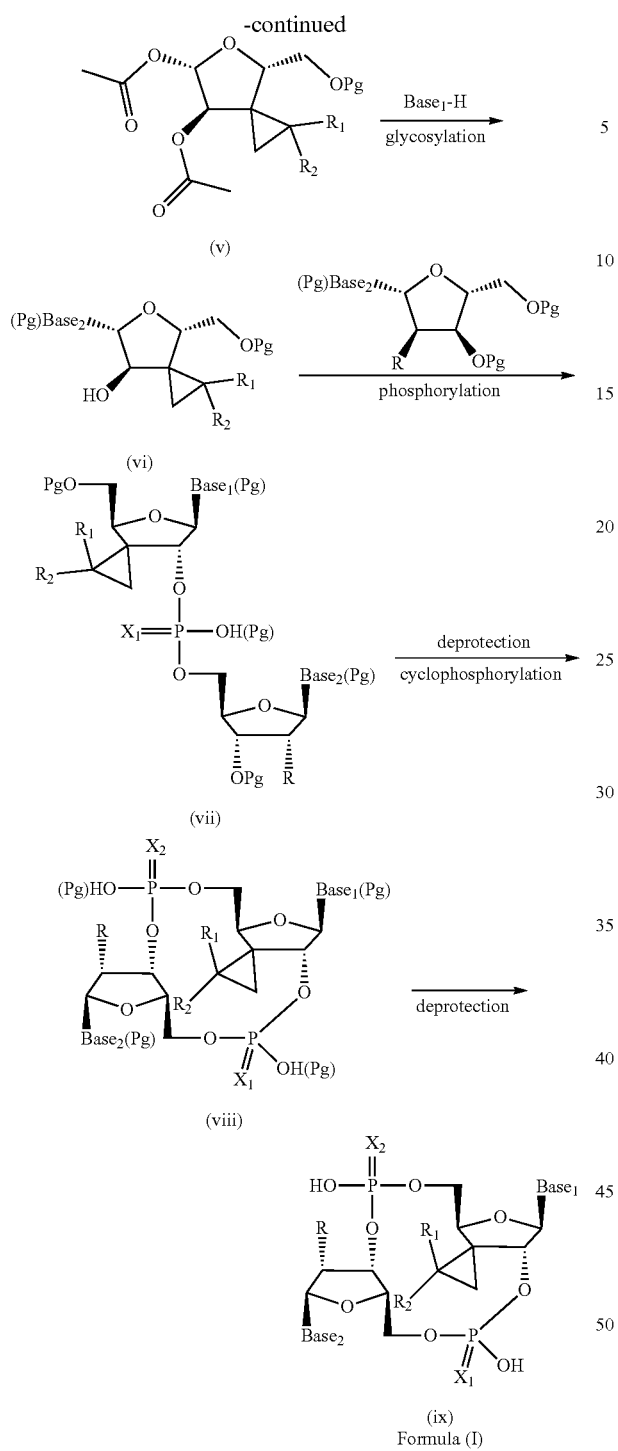

(v)

(vi)

(vii)

(viii)

(ix)
Formula (I)

Pg is an appropriate protecting group. Necessary protecting group exchanges may not be shown in the scheme. (Pg) means the group is optionally protected upon different scenarios.

For example, compounds of Formula (I) can be formed as shown in Scheme I. Compound (i) can be oxidized to give compound (ii); compound (ii) can be olefinated to give compound (iii); compound (iii) can be cyclopropanated to give compound (iv); compound (iv) can be deprotected to give compound (v); compound (v) can go through glycosylation with a nucleobase to give compound (vi); compound (vi) can be phosphorylated along with a protected nucleoside to give compound (vii); compound (vii) can be deprotected and cyclophosphorylated to give compound (viii); compound (viii) can be deprotected to give compound (ix) [i.e., Formula (I)].

ABBREVIATIONS

NMR nuclear magnetic resonance
DMSO dimethyl sulfoxide
LC-MS liquid chromatograph mass spectrometer
HPLC high performance liquid chromatography
UV ultraviolet
NOE nuclear Overhauser effect
TBS tert-butyldimethylsilyl

EXAMPLES

The examples below are intended to be purely exemplary and should not be considered to be limiting in any way. Unless otherwise specified, the experimental methods in the Examples described below are conventional methods. Unless otherwise specified, the reagents and materials are all commercially available. All solvents and chemicals employed are of analytical grade or chemical purity. Solvents are all redistilled before use. Anhydrous solvents are all prepared according to standard methods or reference methods.

Example 1

2-amino-9-((1R,5'S,7'R,8'R,12a'R,14'R,15'R,15a'S)-7'-(6-amino-9H-purin-9-yl)-2,2-difluoro-2',10',15'-trihydroxy-2',10'-dioxidooctahydro-12'H-spiro[cyclopropane-1,16'-[5,8]methanofuro[3,2-1][1,3,6,9,11]pentaoxa[2,10]diphosphacyclotetradecin]-14'-yl)-1,9-dihydro-6H-purin-6-one triethylamine salt

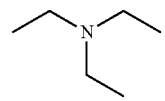

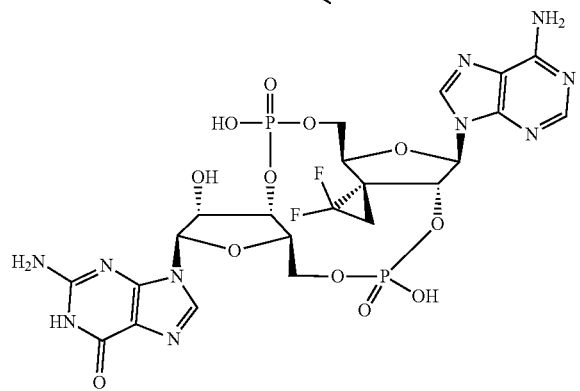

Step 1 (Compound 1-1): ((3aR,5R,6S,6aR)-6-hydroxy-2,2-dimethyltetrahydrofuro[2,3-d][1,3]dioxol-5-yl)methyl benzoate

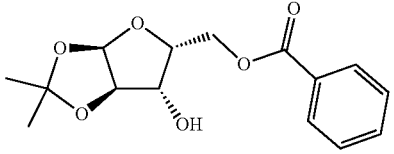 [SMILES: CC1(C)O[C@H]2O[C@H](COC(=O)c3ccccc3)[C@H](O)[C@H]2O1]

To a solution of 1,2-O-isopropylidene-alpha-D-xylofuranose (15 g, 78.86 mmol) in pyridine (100 mL) under nitrogen was added benzoyl chloride (11.6 g, 82.8 mmol) at 0° C. and stirred at room temperature overnight. After completed, the mixture was concentrated and the residue was dissolved in dichloromethane (100 mL). The resulting mixture was washed with saturated aqueous solution of NaHCO$_3$ (100 mL) and brine, dried over Na$_2$SO$_4$, filtered and concentrated. The residue was purified by silica gel column chromatography (Petroleum ether/ethyl acetate=50%) to give the title compound (20.7 g, 89%). $^1$H NMR (400 MHz, DMSO-d6) δ 8.04-7.94 (m, 2H), 7.68 (t, J=7.4 Hz, 1H), 7.55 (t, J=7.7 Hz, 2H), 5.90 (d, J=3.7 Hz, 1H), 5.51 (d, J=5.0 Hz, 1H), 4.49-4.46 (m, 2H), 4.42-4.27 (m, 2H), 4.19-4.09 (m, 1H), 1.40 (s, 3H), 1.25 (s, 3H). LC-MS (M+H)$^+$=294.9.

Step 2 (Compound 1-2): ((3aR,5R,6aS)-2,2-dimethyl-6-oxotetrahydrofuro[2,3-d][1,3]dioxol-5-yl)methyl benzoate

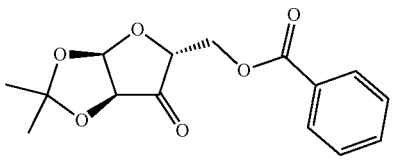 [SMILES: CC1(C)O[C@H]2O[C@H](COC(=O)c3ccccc3)C(=O)[C@H]2O1]

To a solution of ((3aR,5R,6S,6aR)-6-hydroxy-2,2-dimethyltetrahydrofuro[2,3-d][1,3]dioxol-5-yl)methyl benzoate (20.7 g, 70.4 mmol), 2,2,6,6-tetramethylpiperidinooxy (2.2 g, 14.1 mmol), KBr (838 mg, 7.04 mmol, 0.1 eq) and tetrabutylammonium bromide (2.3 g, 7.04 mmol, 0.1 eq) in dichloromethane (150 mL) was added a solution of NaClO (10% in water, 105 mL), then to the reaction mixture was added saturated aqueous solution of NaHCO$_3$ until pH 7. The mixture was vigorously stirred at room temperature for 0.5 h. After completed, the organic layer was separated, and the aqueous layer was extracted with dichloromethane (50 mL). The combined organic layers were washed with brine, dried over Na$_2$SO$_4$, filtered and concentrated. The residue was purified by silica gel column chromatography (Petroleum ether/ethyl acetate=5% to 20%) to give the title compound (14.3 g, 69%). $^1$H NMR (400 MHz, DMSO-d6) δ 8.03-7.88 (m, 2H), 7.68 (t, J=7.4 Hz, 1H), 7.54 (t, J=7.8 Hz, 2H), 6.17 (d, J=4.5 Hz, 1H), 4.88 (t, J=3.2 Hz, 1H), 4.70 (d, J=4.4 Hz, 1H), 4.54 (dd, J=12.2, 2.9 Hz, 1H), 4.44 (dd, J=12.2, 4.4 Hz, 1H), 1.42 (s, 3H), 1.36 (s, 3H). LC-MS (M+H)$^+$=292.9.

Step 3 (Compound 1-3): ((3aR,5S,6aR)-2,2-dimethyl-6-methylenetetrahydrofuro[2,3-d][1,3]dioxol-5-yl)methyl benzoate

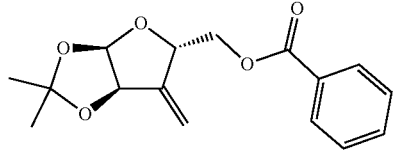 [SMILES: C=C1[C@H]2OC(C)(C)O[C@H]2O[C@@H]1COC(=O)c1ccccc1]

To a suspension of methyltriphenylphosphonium bromide (18.3 g, 51.4 mmol) in tetrahydrofuran (80 mL) was added a solution of potassium tert-butoxide in tetrahydrofuran (51.4 mL, 1.0 M, 51.4 mmol) at 0° C. After 1 h, a solution of ((3aR,5R,6aS)-2,2-dimethyl-6-oxotetrahydrofuro[2,3-d][1,3]dioxol-5-yl)methyl benzoate (14.3 g, 48.9 mmol) in tetrahydrofuran (80 mL) was added dropwise at 0° C. and stirred for 0.5 h. The reaction was quenched with a saturated aqueous solution of NH$_4$Cl (60 mL). The resulting mixture was extracted with ethyl acetate (100 mL). The organic layer was washed with brine, dried over Na$_2$SO$_4$, filtered and concentrated. The residue was purified by silica gel column chromatography (Petroleum ether/ethyl acetate=20%) to give the title compound (7.8 g, 54%). $^1$H NMR (400 MHz, DMSO-d6) δ 8.04-7.90 (m, 2H), 7.68 (t, J=7.4 Hz, 1H), 7.54 (t, J=7.7 Hz, 2H), 5.87 (d, J=4.0 Hz, 1H), 5.49 (d, J=1.3 Hz, 1H), 5.35 (s, 1H), 5.00 (dd, J=10.9, 2.7 Hz, 2H), 4.51 (dd, J=11.9, 3.0 Hz, 1H), 4.36 (dd, J=11.9, 5.2 Hz, 1H), 1.41 (s, 3H), 1.31 (s, 3H). LC-MS (M+H)$^+$=290.8.

Step 4: ((1S,3a'R,5'S,6a'R)-2,2-difluoro-2,2'-dimethyldihydro-5'H-spiro[cyclopropane-1,6'-furo[2,3-d][1,3]dioxol]-5'-yl)methyl benzoate (Compound 1-4-1) and ((1R,3a'R,5'S,6a'R)-2,2-difluoro-2',2'-dimethyldihydro-5'H-spiro[cyclopropane-1,6'-furo[2,3-d][1,3]dioxol]-5'-yl)methyl benzoate (Compound 1-4-2)

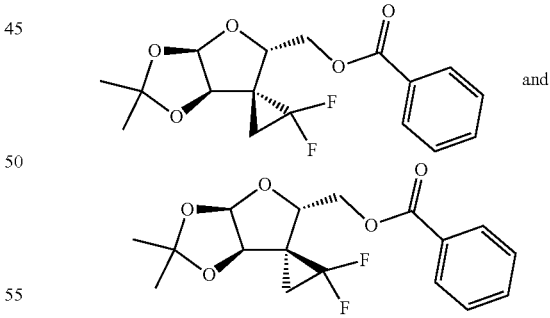

A mixture of ((3aR,5S,6aR)-2,2-dimethyl-6-methylenetetrahydrofuro[2,3-d][1,3]dioxol-5-yl)methyl benzoate (1.05 g, 3.62 mmol), NaI (109 mg. 0.72 mmol) and (trifluoromethyl)trimethylsilane (10.6 mL, 72.4 mmol) in 1,4-dioxane (8 mL) was remained at 130° C. in a sealed tube for 6 days. The mixture was concentrated and the residue was purified by silica gel column chromatography (Petroleum ether/ethyl acetate=0% to 10%) to give the title compounds: Compound 1-4-1: 390 mg, 31%; Compound 1-4-2: 580 mg, 47%.

Compound 1-4-1: $^1$H NMR (400 MHz, CDCl$_3$) δ 8.13-7.93 (m, 2H), 7.58 (t, J=7.4 Hz, 1H), 7.46 (t, J=7.7 Hz, 2H), 6.01 (d, J=4.3 Hz, 1H), 4.73 (d, J=4.3 Hz, 1H), 4.70-4.67 (m, 1H), 4.51-4.47 (m, 1H), 4.37-4.32 (m, 1H), 1.95-1.88 (m, 1H), 1.64-1.57 (m, 1H), 1.55 (s, 3H), 1.40 (s, 3H). LC-MS (M+H)$^+$=340.8.

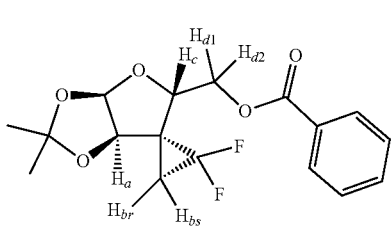

Compound 1-4-1

Key NOE Correlation of Compound 1-4-1: H$_{bs}$ (1.64-1.57, m)-H$_c$ (4.70-4.67, m): 1.0%.

Compound 1-4-2: $^1$H NMR (400 MHz, CDCl$_3$) δ 8.16-7.94 (m, 2H), 7.58 (t, J=7.4 Hz, 1H), 7.45 (t, J=7.7 Hz, 2H), 6.00 (d, J=3.7 Hz, 1H), 4.91-4.76 (m, 1H), 4.47 (app s, 1H), 4.40 (dd, J=11.9, 3.4 Hz, 1H), 4.22 (dd, J=11.9, 5.8 Hz, 1H), 1.77-1.70 (m, 1H), 1.62 (s, 3H), 1.59-1.52 (m, 1H), 1.37 (s, 3H). LC-MS (M+H)$^+$=340.9.

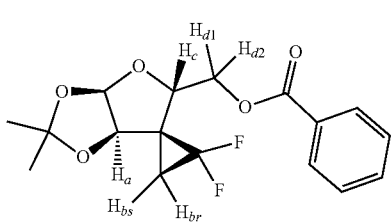

Compound 1-4-2

Key NOE Correlations of Compound 1-4-2: H$_a$ (4.47, app s)-H$_{bs}$ (1.59-1.52, m): 2.5%; H$_{br}$ (1.77-1.70, m)-H$_{d1}$ (4.40, dd): 1.7%; H$_{br}$ (1.77-1.70, m)-H$_{d2}$ (4.22, dd): 2.0%.

Step 5 (Compound 1-5): (3R,4S,7R)-4-((benzoyloxy)methyl)-1,1-difluoro-5-oxaspiro[2.4]heptane-6,7-diyl diacetate

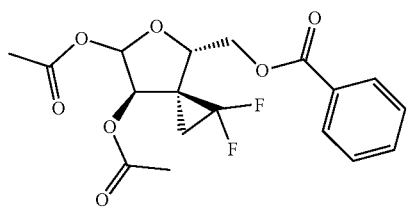 [SMILES: CC(=O)OC1O[C@H](COC(=O)c2ccccc2)[C@]2(CC2(F)F)[C@H]1OC(C)=O]

A mixture of ((1R,3a'R,5'S,6a'R)-2,2-difluoro-2',2'-dimethyldihydro-5'H-spiro[cyclopropane-1,6'-furo[2,3-d][1,3]dioxol]-5'-yl)methyl benzoate (580 mg, 1.71 mmol), acetic acid (8 mL) and water (2.4 mL) was stirred at 110° C. for 5 h. Then the mixture was concentrated and co-evaporated with toluene (20 mL) for 3 times. The residue was dissolved in pyridine (20 mL), then 4-dimethylaminopyridine (21 mg, 0.17 mmol) was added at 0° C. followed by addition of acetic anhydride (1.0 mL). The mixture was stirred at room temperature overnight. The mixture was concentrated and the residue was dissolve with dichloromethane (30 mL). The resulting mixture was washed with saturated aqueous solution of NaHCO$_3$ and brine, dried over Na$_2$SO$_4$, filtered and concentrated. The residue was purified by silica gel column chromatography (Petroleum ether/ethyl acetate=0% to 30%) to give the title compound (580 mg, 88%). $^1$H NMR (400 MHz, DMSO-d6) δ 8.01-7.97 (m, 2H), 7.68 (t, J=7.4 Hz, 1H), 7.55 (t, J=7.7 Hz, 2H), 6.08 (s, 1H), 5.28 (s, 1H), 4.81 (t, J=4.6 Hz, 1H), 4.44 (dd, J=12.1, 4.3 Hz, 1H), 4.24 (dd, J=12.1, 5.4 Hz, 1H), 2.45-2.35 (m, 1H), 2.18-2.12 (m, 1H), 2.09 (s, 3H), 1.89 (s, 3H). LC-MS (M-OAc)$^+$=324.8.

Step 6 (Compound 1-6): ((3R,4S,6R,7R)-7-acetoxy-6-(6-benzamido-9H-purin-9-yl)-1,1-difluoro-5-oxaspiro[2.4]heptan-4-yl)methyl benzoate

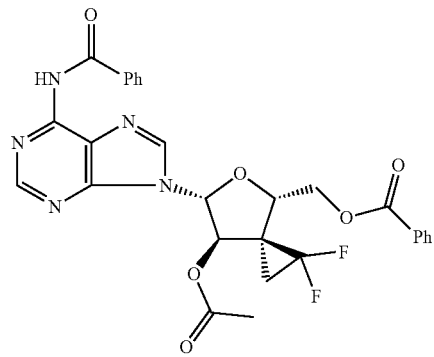 [SMILES: CC(=O)O[C@H]1[C@H](n2cnc3c(NC(=O)c4ccccc4)ncnc32)O[C@H](COC(=O)c2ccccc2)[C@]12CC2(F)F]

To a mixture of (3R,4S,7R)-4-((benzoyloxy)methyl)-1,1-difluoro-5-oxaspiro[2.4]heptane-6,7-diyl diacetate (310 mg, 0.81 mmol) and N-benzoylaminopurine (212 mg, 0.89 mmol) in acetonitrile (10 mL) under nitrogen was added a solution of tin tetrachloride in dichloromethane (2.5 mL, 1.0 M, 2.5 mmol) at 0° C. and the reaction mixture was heated to 70° C., stirred for 2 h. The reaction was quenched with saturated aqueous solution of NaHCO$_3$ (20 mL) and the mixture was filtered. The filtrate was extracted with ethyl acetate (20 mL*3). The combined organic layers were washed with brine, dried over Na$_2$SO$_4$, filtered and concentrated. The residue was purified by silica gel column chromatography (methanol/dichloromethane=0% to 10%) to give the title compound (410 mg, 89%). $^1$H NMR (400 MHz, DMSO-d6) δ 11.24 (s, 1H), 8.74 (s, 1H), 8.56 (s, 1H), 8.06 (d, J=7.5 Hz, 2H), 7.91-7.84 (m, 2H), 7.69-7.62 (m, 2H), 7.57 (t, J=7.5 Hz, 2H), 7.50 (t, J=7.7 Hz, 2H), 6.46 (d, J=1.6 Hz, 1H), 6.11 (s, 1H), 5.00-4.92 (m, 1H), 4.52 (dd, J=12.2, 3.5 Hz, 1H), 4.39 (dd, J=12.3, 5.8 Hz, 1H), 2.56-2.44 (m, 1H), 2.40-2.28 (m, 1H), 2.15 (s, 3H). LC-MS (M+H)$^+$=563.8.

Step 7 (Compound 1-7): (3S,4S,6R,7R)-6-(6-amino-9H-purin-9-yl)-1,1-difluoro-4-(hydroxymethyl)-5-oxaspiro[2.4]heptan-7-ol

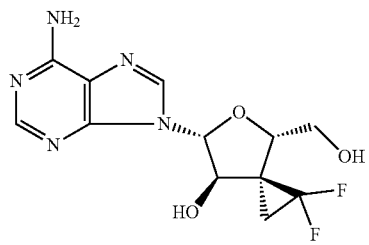 [SMILES: Nc1ncnc2c1ncn2[C@@H]1O[C@H](CO)[C@]2(CC2(F)F)[C@H]1O]

A mixture of ((3R,4S,6R,7R)-7-acetoxy-6-(6-benzamido-9H-purin-9-yl)-1,1-difluoro-5-oxaspiro[2.4]heptan-4-yl)methyl benzoate (7.3 g, 13.0 mmol) and ammonium hydroxide (25%, 50 mL) was stirred at 70° C. overnight. The mixture was concentrated and the residue was purified by C18 column chromatography (Acetonitrile/water with 0.1% NH$_4$HCO$_3$=0% to 50%) to give the title compound (2.7 g, 66%). $^1$NMR (400 MHz, CD$_3$OD) δ 8.47 (s, 1H), 8.20 (s, 1H), 6.05 (d, J=3.5 Hz, 1H), 4.72 (s, 1H), 4.54 (s, 1H), 3.90 (dd, J=12.8, 2.4 Hz, 1H), 3.62 (dd, J=12.8, 3.0 Hz, 1H), 2.00-1.85 (m, 1H), 1.75-1.59 (m, 1H). LC-MS (M+H)$^+$= 313.9.

Step 8 (Compound 1-8): N-(94(3S,4S,6R,7R)-1,1-difluoro-7-hydroxy-4-(hydroxymethyl)-5-oxaspiro[2.4]heptan-6-yl)-9H-purin-6-yl)benzamide

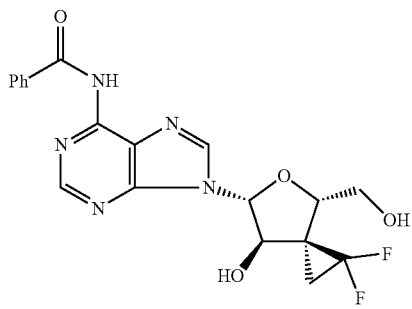 [SMILES: O=C(Nc1ncnc2c1ncn2[C@@H]1O[C@H](CO)[C@]2(CC2(F)F)[C@H]1O)c1ccccc1]

To a solution of (3S,4S,6R,7R)-6-(6-amino-9H-purin-9-yl)-1,1-difluoro-4-(hydroxymethyl)-5-oxaspiro[2.4]heptan-7-ol (530 mg, 1.69 mmol) in pyridine (8 mL) under nitrogen at 0° C. was added chlorotrimethylsilane (1.46 g, 13.5 mmol) and the reaction mixture was stirred at 0° C. for 1 h. Benzoyl chloride (1.2 g, 8.47 mmol) was added and the mixture was stirred at room temperature overnight. Water (5 mL) was added and the mixture was stirred at room temperature for 20 min. After added ammonium hydroxide (25%, 5 mL), the mixture was stirred for 1 hour. Then the mixture was extracted with dichloromethane (20 mL*3). The combined organic layers were washed with brine, dried over Na$_2$SO$_4$, filtered and evaporated. The residue was purified by silica gel column chromatography (methanol/dichloromethane=0% to 8%) to give the title compound (180 mg, 26%). $^1$H NMR (400 MHz, DMSO-d6) δ 11.21 (s, 1H), 8.77 (s, 1H), 8.72 (s, 1H), 8.05 (d, J=7.3 Hz, 2H), 7.65 (t, J=7.4 Hz, 1H), 7.55 (t, J=7.6 Hz, 2H), 6.27 (d, J=5.5 Hz, 1H), 6.17 (d, J=2.0 Hz, 1H), 5.22 (t, J=5.3 Hz, 1H), 4.66 (d, J=3.0 Hz, 1H), 4.51 (s, 1H), 3.76-3.64 (m, 1H), 3.59-3.44 (m, 1H), 2.01 (q, J=8.6 Hz, 1H), 1.87 (q, J=9.1 Hz, 1H). LC-MS (M+H)$^+$=417.8.

Step 9 (Intermediate I): N-(9-((3S,4S,6R,7R)-4-((bis(4-methoxyphenyl)(phenyl)methoxy)methyl)-1,1-difluoro-7-hydroxy-5-oxaspiro[2.4]heptan-6-yl)-9H-purin-6-yl)benzamide

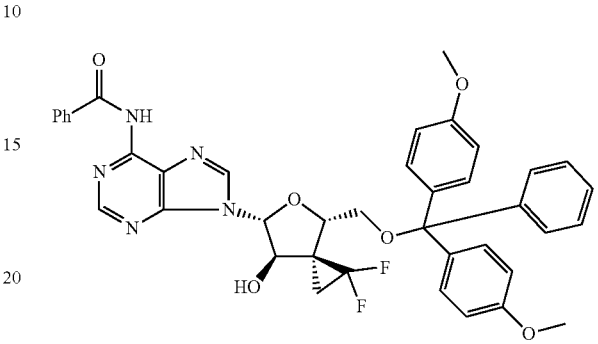

To a solution of N-(9-((3S,4S,6R,7R)-1,1-difluoro-7-hydroxy-4-(hydroxymethyl)-5-oxaspiro[2.4]heptan-6-yl)-9H-purin-6-yl)benzamide (2.6 g, 6.24 mmol) in pyridine (40 mL) under nitrogen was added 4,4'-dimethoxytrityl chloride (6.3 g, 18.7 mmol) and the mixture was stirred at 50° C. overnight. The reaction was quenched with methanol and the resulting mixture was concentrated. The residue was purified by silica gel column chromatography (silica gel was pre-treated with ammonium hydroxide, dichloromethane/petroleum ether=2/1, then methanol/dichloromethane=0% to 5%) to give the title compound (1.6 g, 36%). $^1$H NMR (400 MHz, CD$_3$OD) δ 8.68 (s, 1H), 8.52 (s, 1H), 8.07 (d, J=7.8 Hz, 2H), 7.65 (t, J=7.0 Hz, 1H), 7.55 (t, J=7.7 Hz, 2H), 7.36 (d, J=7.9 Hz, 2H), 7.29-7.14 (m, 7H), 6.79 (dd, J=8.1, 5.4 Hz, 4H), 6.24 (s, 1H), 4.78 (s, 1H), 3.79-3.70 (m, 7H), 3.34 (dd, J=10.9, 3.3 Hz, 1H), 3.18 (dd, J=10.8, 4.5 Hz, 1H), 1.71 (t, J=8.8 Hz, 2H). LC-MS (M+H)$^+$=719.8.

Step 10 (Intermediate II): ammonium (2R,3R,4R,5R)-4-((tert-butyldimethylsilyl)oxy)-2-(hydroxymethyl)-5-(2-isobutyramido-6-oxo-1,6-dihydro-9H-purin-9-yl)tetrahydrofuran-3-yl phosphonate

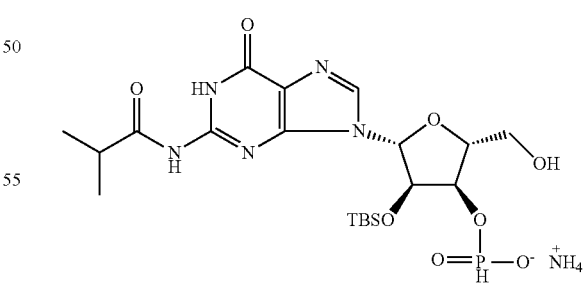

To a solution of N-(9-((2R,3R,4R,5R)-5-((bis(4-methoxyphenyl)(phenyl)methoxy)methyl)-3-((tert-butyldimethylsilyl)oxy)-4-hydroxytetrahydrofuran-2-yl)-6-oxo-6,9-dihydro-1H-purin-2-yl)isobutyramide (5.0 g, 6.5 mmol, pretreated with 5 Å molecular sieve) in pyridine (50 mL) under nitrogen was added biphenyl phosphite (3.0 g, 13 mmol). The mixture was stirred at room temperature overnight. The mixture was filtered and concentrated. The residue was dissolved in dichloromethane (60 mL), and to which was added a saturated aqueous solution of NaHCO$_3$ (100 mL) and then vigorously stirred for 1 h. The organic layer was separated and the aqueous layer was extracted with dichloromethane (100 mL). To the combined organic layers was added water (1 mL) and dichloroacetic acid (8.3 g, 65 mmol, 10 eq) and the mixture was stirred at room temperature for 1 h. The mixture was neutralized with ammonium hydroxide to pH~7, concentrated, and purified by C18 column chromatography (Acetonitrile/water with 0.1% NH$_4$HCO$_3$=0% to 50%) to give the title compound (2.2 g, 61%). $^1$H NMR (400 MHz, CD$_3$OD) δ 8.54 (s, 1H), 7.95 (s, 0.5H), 6.37 (s, 0.5H), 6.24 (d, J=6.5 Hz, 1H), 5.04-4.91 (m, 2H), 4.51 (d, J=2.2 Hz, 1H), 4.10-3.96 (m, 2H), 3.55 (s, 1H), 2.94 (dt, J=13.7, 6.8 Hz, 1H), 1.43 (dd, J=6.8, 0.9 Hz, 6H), 0.98 (s, 9H), 0.22 (s, 3H), −0.00 (s, 3H). LC-MS (M+H)$^+$=531.8.

Step 11 (Compound 1-11): (3R,4S,6R,7R)-6-(6-benzamido-9H-purin-9-yl)-4-((bis(4-methoxyphenyl)(phenyl)methoxy)methyl)-1,1-difluoro-5-oxaspiro[2.4]heptan-7-yl (2-cyanoethyl) diisopropylphosphoramidite

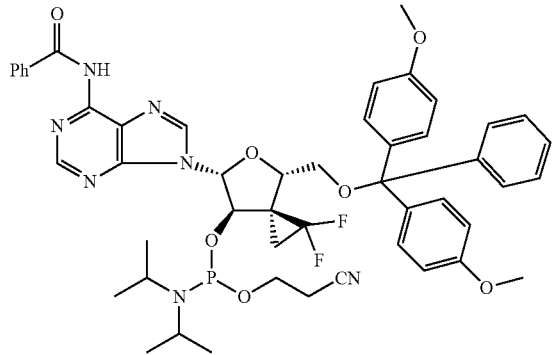 [SMILES: COc1ccc(C(OC[C@H]2O[C@@H](n3cnc4c(NC(=O)c5ccccc5)ncnc43)[C@H](OP(OCCC#N)N(C(C)C)C(C)C)[C@@]23CC3(F)F)(c2ccccc2)c2ccc(OC)cc2)cc1]

To a solution of N-(9-((3S,4S,6R,7R)-4-((bis(4-methoxyphenyl)(phenyl)methoxy)methyl)-1,1-difluoro-7-hydroxy-5-oxaspiro[2.4]heptan-6-yl)-9H-purin-6-yl)benzamide (1.6 g, 2.22 mmol) in anhydrous dichloromethane (30 mL, pre-treated with 5 Å molecular sieve for 30 minutes) was added tetrazole (14.8 mL, 0.45 M, 6.66 mmol) at 0° C. and the mixture was stirred for 10 minutes. Then 2-cyanoethyl N, N, N',N'-tetraisopropylphosphorodiamidite (871 mg, 2.89 mmol) was added and the mixture was stirred at room temperature overnight. The mixture was filtered and concentrated. The residue was purified by silica gel (pre-treated with ammonium hydroxide) column chromatography (Petroleum ether/ethyl acetate=20% to 50%) to give the title compound (1.7 g, 83%). LC-MS (M-diisopropylamine+O)$^+$= 836.8.

Step 12 (Compound 1-12): (2R,3R,4R,5R)-2-((((((3R,4S,6R,7R)-6-(6-benzamido-9H-purin-9-yl)-1,1-difluoro-4-(hydroxymethyl)-5-oxaspiro[2.4]heptan-7-yl)oxy)(2-cyanoethoxy)phosphoryl)oxy)methyl)-4-((tert-butyldimethylsilyl)oxy)-5-(2-isobutyramido-6-oxo-1,6-dihydro-9H-purin-9-yl)tetrahydrofuran-3-yl hydrogen phosphonate

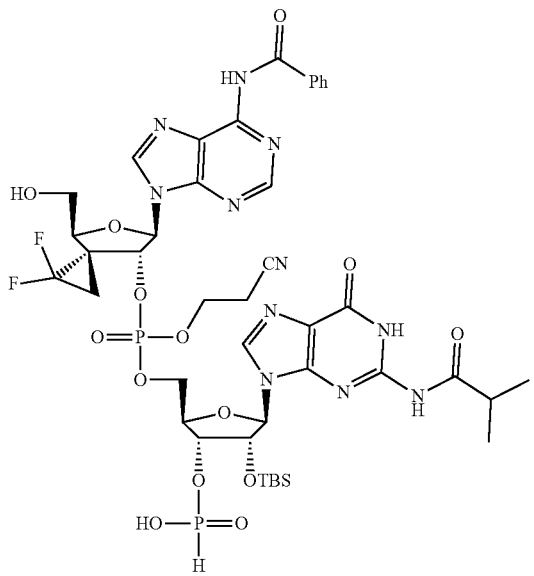 [SMILES: CC(C)C(=O)Nc1nc2c(ncn2[C@@H]2O[C@H](COP(=O)(OCCC#N)O[C@H]3[C@H](n4cnc5c(NC(=O)c6ccccc6)ncnc54)O[C@H](CO)[C@]34CC4(F)F)[C@@H](O[PH](=O)O)[C@H]2O[Si](C)(C)C(C)(C)C)c(=O)[nH]1]

To a solution of ammonium (2R,3R,4R,5R)-4-((tert-butyldimethylsilyl)oxy)-2-(hydroxymethyl)-5-(2-isobutyramido-6-oxo-1,6-dihydro-9H-purin-9-yl)tetrahydrofuran-3-yl phosphonate (984 mg, 1.79 mmol) in anhydrous acetonitrile (10 mL, pre-treated with 5 Å molecular sieve for 30 minutes) was sequentially added a mixture of Compound 11 (1.5 g, 1.63 mmol) in anhydrous acetonitrile (10 mL) and a mixture of pyridine trifluoroacetate (1.26 g, 6.52 mmol) in anhydrous acetonitrile (10 mL), both of which was treated with 5 Å molecular sieve for 30 minutes and the mixture was stirred at room temperature for 3 h. Tert-butyl hydroperoxide (0.82 mL, 5.5 M, 4.5 mmol) was added and the mixture was stirred overnight. The reaction was quenched by addition of sodium bisulfite (508 mg, 4.89 mmol) at 0° C. The mixture was stirred at room temperature for 10 minutes, then the mixture was filtered and evaporated. The residue was dissolved in dichloromethane (50 mL) followed by addition of water (10 eq) and dichloroacetic acid (2.1 g, 16.3 mmol). After the deprotection was completed, ammonium hydroxide was added at 0° C. and the mixture was stirred for 1 h. The mixture was concentrated and the residue was purified by C18 column chromatography (Acetonitrile/water with 0.1% NH$_4$HCO$_3$=0% to 50%) to give the title compound (600 mg, 34%). $^1$H NMR (400 MHz, DMSO-d6) δ 9.20 (s, 1H), 8.64 (s, 1H), 8.57 (s, 1H), 8.46-8.42 (m, 2H), 8.02-7.99 (m, 1H), 7.93-7.89 (m, 2H), 6.95 (s, 1H), 6.91 (s, 1H), 6.39-6.32 (m, 2H), 6.28 (d, J=7.6 Hz, 1H), 6.08 (d, J=7.0 Hz, 1H), 6.00 (d, J=6.8 Hz, 1H), 4.07-4.01 (m, 2H), 3.86-3.81 (m, 2H), 3.67 (s, 1H), 3.09-3.04 (m, 2H), 2.69 (s, 1H), 2.55 (s, 2H), 2.37 (s, 1H), 1.56 (d, J=6.4 Hz, 6H), 1.03 (s, 9H), 0.11-0.08 (m, 6H). LC-MS (M+H)$^+$=1063.7.

Step 13 (Compound 1-13): N-(9-((1R,5'S,7'R,8'R, 12a'R,14'R,15'R,15a'R)-15'-((tert-butyldimethylsilyl) oxy)-10'-(2-cyanoethoxy)-2,2-difluoro-2'-hydroxy- 14'-(2-isobutyramido-6-oxo-1,6-dihydro-9H-purin-9- yl)-2',10'-dioxidooctahydro-12'H-spiro [cyclopropane-1,16'-[5,8]methanofuro[3,2-1][1,3,6, 9,11]pentaoxa[2,10]diphosphacyclotetradecin]-7'- yl)-9H-purin-6-yl)benzamide

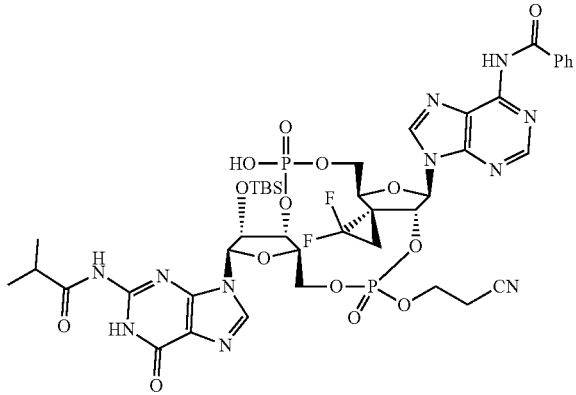 [SMILES: CC(C)C(=O)Nc1nc2c(ncn2[C@@H]2O[C@@H]3COP(=O)(OCCC#N)O[C@H]4[C@H](n5cnc6c(NC(=O)c7ccccc7)ncnc65)O[C@H](COP(=O)(O)O[C@H]3[C@H]2O[Si](C)(C)C(C)(C)C)[C@]42CC2(F)F)c(=O)[nH]1]

To a solution of (2R,3R,4R,5R)-2-((((((3R,4S,6R,7R)-6- (6-benzamido-9H-purin-9-yl)-1,1-difluoro-4-(hydroxym- ethyl)-5-oxaspiro[2.4]heptan-7-yl)oxy)(2-cyanoethoxy) phosphoryl)oxy)methyl)-4-((tert-butyldimethylsilyl)oxy)-5- (2-isobutyramido-6-oxo-1,6-dihydro-9H-purin-9-yl) tetrahydrofuran-3-yl hydrogen phosphonate (106 mg, 0.1 mmol) in anhydrous pyridine (5 mL) under nitrogen was added pivaloyl chloride (73 mg, 0.6 mmol) and the reaction mixture was stirred at room temperature for 1 h. Water (108 mg, 6 mmol) was added followed by addition of a solution of 12 (33 mg, 0.13 mmol) in anhydrous pyridine (0.5 mL). After stirred for 30 min, an aqueous solution of NaHSO$_3$ (1.5 mL) was added followed by addition of aqueous solution of NaHCO$_3$ (10 mL). The resulting mixture was extracted with ethyl acetate (10 mL). The combined organic layer was dried over Na$_2$SO$_4$, filtered and concentrated at room temperature. The residue was purified by C18 column chromatography (Acetonitrile/water with 0.1% NH$_4$HCO$_3$=0% to 50%) to give the title compound (35 mg, 33%). LC-MS (M+H)$^+$= 1061.6.

Step 14 (Compound 1-14): 2-amino-9-((1R,5'S,7'R, 8'R,12a'R,14'R,15'R,15a'R)-7'-(6-amino-9H-purin-9- yl)-15'-((tert-butyldimethylsilyl)oxy)-2,2-difluoro-2', 10'-dihydroxy-2',10'-dioxidooctahydro-12'H-Spiro [cyclopropane-1,16'-[5,8]methanofuro[3,2-1][1,3,6, 9,11]pentaoxa[2,10]diphosphacyclotetradecin]-14'- yl)-1,9-dihydro-6H-purin-6-one

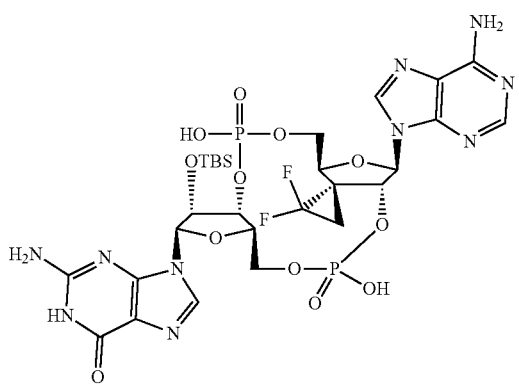 [SMILES: CC(C)(C)[Si](C)(C)O[C@@H]1[C@@H]2OP(=O)(O)OC[C@H]3O[C@@H](n4cnc5c(N)ncnc54)[C@H](OP(=O)(O)OC[C@H]2O[C@H]1n1cnc2c(=O)[nH]c(N)nc21)[C@@]31CC1(F)F]

A mixture of N-(9-((1R,5'S,7'R,8'R,12a'R,14'R,15'R, 15a'R)-15'-((tert-butyldimethylsilyl)oxy)-10'-(2-cyanoeth- oxy)-2,2-difluoro-2'-hydroxy-14'-(2-isobutyramido-6-oxo- 1,6-dihydro-9H-purin-9-yl)-2',10'-dioxidooctahydro-12'H- spiro[cyclopropane-1,16'-[5,8]methanofuro[3,2-1][1,3,6,9, 11]pentaoxa[2,10]diphosphacyclotetradecin]-7'-yl)-9H- purin-6-yl)benzamide (35 mg, 0.033 mmol) in ammonium hydroxide (25%, 2 mL) was stirred at 70° C. for 1 h. The mixture was cooled to room temperature and the mixture was directly purified by C18 column chromatography (Acetonitrile/water with 0.1% NH$_4$HCO$_3$=0% to 50%) to give the title compound (10 mg, 36%). LC-MS (M+H)$^+$=834.7.

Step 15 (Example 1): 2-amino-9-((1R,5'S,7'R,8'R, 12a'R,14'R,15'R,15a'S)-7'-(6-amino-9H-purin-9-yl)- 2,2-difluoro-2',10',15'-trihydroxy-2',10'-dioxiocta- hydro-12'H-spiro[cyclopropane-1,16'-[5,8] methanofuro[3,2-1][1,3,6,9,11]pentaoxa[2,10] diphosphacyclotetradecin]-14'-yl)-1,9-dihydro-6H- purin-6-one triethylamine salt

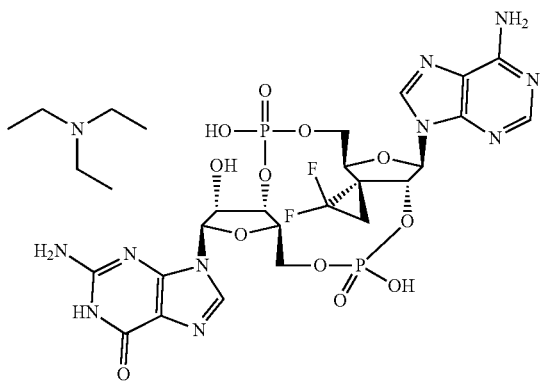

A mixture of 2-amino-9-((1R,5'S,7'R,8'R,12a'R,14'R, 15'R,15a'R)-7'-(6-amino-9H-purin-9-yl)-15'-((tert-butyldi- methylsilyl)oxy)-2,2-difluoro-2',10'-dihydroxy-2',10'-dioxi- dooctahydro-12'H-spiro[cyclopropane-1,16'-[5,8] methanofuro[3,2-1][1,3,6,9,11]pentaoxa[2,10] diphosphacyclotetradecin]-14'-yl)-1,9-dihydro-6H-purin-6- one (10 mg, 0.012 mmol) and triethylamine trihydrofluoride (0.5 mL) was stirred at 40° C. for 1 h. The reaction was quenched with a saturated aqueous solution of NaHCO$_3$ (2.0 mL). The resulting mixture was directly purified by C18 column chromatography (Acetonitrile/water with 0.1% NH$_4$HCO$_3$=0% to 50%) to give Example 1 (0.82 mg, 9%). $^1$H NMR (400 MHz, D$_2$O) δ 8.58 (s, 1H), 8.17 (s, 1H), 7.78 (s, 1H), 6.18 (d, J=7.7 Hz, 1H), 5.90 (s, 1H), 5.54 (s, 1H), 5.09-4.90 (m, 2H), 4.49-4.39 (m, 2H), 4.21-4.14 (m, 3H), 4.02-3.93 (m, 1H), 3.12 (d, J=6.9 Hz, 6H), 2.17 (s, 1H), 1.82-1.77 (m, 1H), 1.21 (d, J=6.8 Hz, 9H). LC-MS (M+H)$^+$= 720.6.

Example 2

2-amino-9-((1R,5'S,7'R,8'R,10'R,12a'R,14'R,15'R, 15a'R)-7'-(6-amino-9H-purin-9-yl)-2,2,15'-trifluoro-2',10'-dihydroxy-2',10'-disulfidooctahydro-12'H-spiro[cyclopropane-1,16'-[5,8]methanofuro[3,2-l][1,3,6,9,11]pentaoxa[2,10]diphosphacyclotetradecin]-14'-yl)-1,9-dihydro-6H-purin-6-one

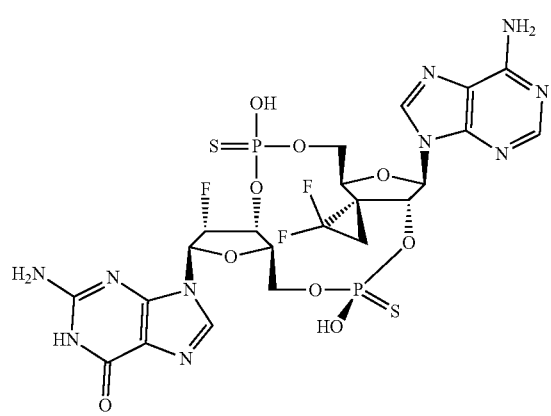 [SMILES: Nc1nc2c(ncn2[C@@H]2O[C@@H]3CO[P@@](O)(=S)O[C@H]4[C@H](n5cnc6c(N)ncnc65)O[C@H](COP(O)(=S)O[C@H]3[C@H]2F)[C@]42CC2(F)F)c(=O)[nH]1]

Step 1 (Intermediate III): Bis(perfluorophenyl) hydrogen phosphorotetrathioate triethylamine salt

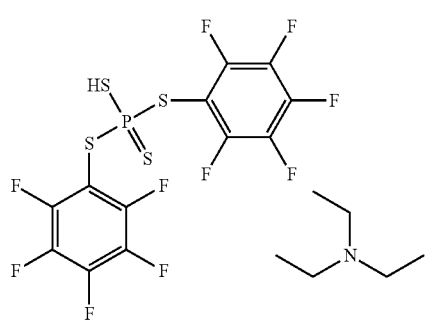

To the solution of phosphorus pentasulfide (30 g, 132 mmol) in toluene (240 mL) was added pentafluorothiophenol (55 g, 267 mmol). The atmosphere was flushed with nitrogen for 2 minutes. Triethylamine (39 mL, 277 mmol) was added over a period of 30 min. The mixture was stirred at room temperature overnight. The resulting slurry was filtered, and the filtrate was concentrated under vacuum. The crude was suspended in methanol (180 mL) and heptane (180 mL). The biphasic mixture was stirred for 15 minutes. Water (150 mL) was added over a period of 30 minutes. After the addition of water was complete, the mixture was kept being stirred for 1 h, then filtered. The filter cake was rinsed with water/methanol (3:2 v/v, 75 mL), water (90 mL*2) and heptane (45 mL*2). The solid was dried in vacuo to give the title compound (54 g, 67%).

Step 2 (Compound 2-2): (1S,4S)-1-methyl-4-(prop-1-en-2-yl)-7-oxabicyclo[4.1.0]heptane

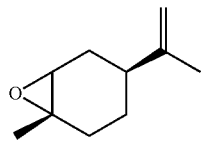

To a 500 mL reactor was added 30% hydrogen peroxide (39 mL), phenylphosphonic acid (542 mg, 3.43 mmol), methyltrioctylammonium hydrogen sulfate (3.2 g, 6.87 mmol), $Na_2SO_4$ (14.6 g, 103 mmol), sodium tungstate decahydrate (2.3 g, 6.87 mmol) followed by water (20 mL). To the solution was slowly added (−)-limonene (47 g, 343 mmol) with vigorous stirring while keeping the temperature below 30° C. After 16 h, hexane (50 mL) was added. The separated organic layer was washed with sodium bisulfate (25 mL, 10% aqueous), $NaHCO_3$ (25 mL, saturated aqueous), then brine. The organic layer was dried over $Na_2SO_4$, filtered and concentrated. The residue was dissolved in pyrrolidine (30 mL) and water (5 mL, 0.8 eq). The reaction was stirred at 85° C. overnight. After the reaction was cooled to room temperature, hexane (50 mL) was added. The organic layer was washed with citric acid (20% aqueous), saturated $NaHCO_3$, and brine. The organic layer was dried over $Na_2SO_4$, filtered and concentrated. The crude was distilled to give the title compound (23.8 g, 45%). $^1$H NMR (400 MHz, $CDCl_3$) δ 4.73 (s, 1H), 4.67 (s, 1H), 3.06 (s, 1H), 2.13-2.06 (m, 1H), 1.91-1.80 (m, 2H), 1.75-1.62 (m, 5H), 1.60-1.48 (m, 1H), 1.35-1.26 (m, 3H), 1.25-1.15 (m, 1H).

Step 3 (Intermediate IV): (2R,3aR,6S,7aR)-3a-methyl-2-((perfluorophenyl)thio)-6-(prop-1-en-2-yl)hexahydrobenzo[d][1,3,2]oxathiaphosphole 2-sulfide

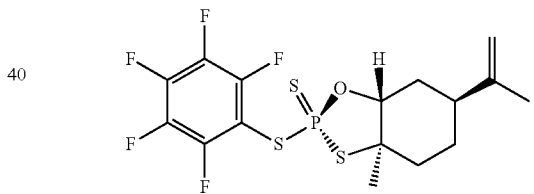

To a solution of Bis(perfluorophenyl) hydrogen phosphorotetrathioate triethylamine salt (54 g, 90.7 mmol) and (1S,4S)-1-methyl-4-(prop-1-en-2-yl)-7-oxabicyclo[4.1.0] heptane (20.7 g, 136 mmol) in chloroform (580 mL) was added dibutyl phosphate (21 g, 99.7 mmol) followed by dichloroacetic acid (26 g, 199.5 mmol). The reaction mixture was warmed to 55° C. and stirred for 3 h. The mixture was concentrated to 300 mL under vacuum. Hexane (500 mL) was added and the combined organic layers were washed with $K_2HPO_4$ (10% aqueous) followed by water. The content was concentrated to 120 mL in vacuo. Methanol (500 mL) was added and the batch was concentrated to 100 mL. Methanol (300 mL) was added and the batch was concentrated to 300 mL. The resulting slurry was heated to 60° C. until completed dissolution of the reagents. The mixture was cooled to 20° C. over 1 h. Water (22 mL) was added dropwise and the mixture was stirred for 15 h. The resulting slurry was filtered and the filter cake was rinsed with water/methanol (1/9). The solid was dried in vacuo to give the title compound (25 g, 61%). $^1$H NMR (400 MHz, $CDCl_3$) δ 5.02 (d, J=0.7 Hz, 1H), 4.86 (s, 1H), 4.30-4.25 (m, 1H), 2.60 (s, 1H), 2.35 (dd, J=13.4, 1.7 Hz, 1H), 2.10-1.87 (m, 4H), 1.81 (s, 3H), 1.79-1.70 (m, 1H), 1.67 (s, 3H).

Step 4 (Intermediate V): N-(9-((2R,3R,4R,5R)-4-((tert-butyldimethylsilyl)oxy)-3-fluoro-5-(hydroxymethyl)tetrahydrofuran-2-yl)-6-oxo-6,9-dihydro-1H-purin-2-yl)isobutyramide

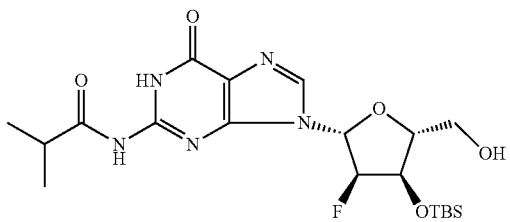 [SMILES: CC(C)C(=O)Nc1nc2c(ncn2[C@@H]2O[C@H](CO)[C@@H](O[Si](C)(C)C(C)(C)C)[C@H]2F)c(=O)[nH]1]

To a solution of N-(9-((2R,3R,4R,5R)-5-((bis(4-methoxyphenyl)(phenyl)methoxy)methyl)-3-fluoro-4-hydroxytetrahydrofuran-2-yl)-6-oxo-6,9-dihydro-1H-purin-2-yl)isobutyramide (2.0 g, 3.04 mmol) and imidazole (455 mg, 6.69 mmol) in anhydrous N,N-dimethylformamide (30 mL) under nitrogen at 0° C. was added tert-butylchlorodimethylsilane (918 mg, 6.08 mmol) and the mixture was stirred overnight. Ethyl acetate (80 mL) and water (80 mL) was added and the organic layer was separated. The aqueous layer was extracted with ethyl acetate (80 mL). The combined organic layers were washed with water and brine, dried over $Na_2SO_4$, filtered and concentrated. The residue was dissolved with dichloromethane and added dichloroacetic acid (1 mL). The mixture was stirred overnight and then quenched with methanol. After concentration, the residue was purified by column chromatography (methanol/dichloromethane=0% to 10%, ammonium hydroxide) to give the title compound (1.2 g, 84%). $^1$H NMR (400 MHz, DMSO-d6) δ 12.01 (s, 1H), 11.58 (s, 1H), 8.19 (s, 1H), 6.11-5.84 (m, 1H), 5.48-5.05 (m, 2H), 4.44-4.40 (m, 1H), 3.87 (s, 1H), 3.63 (d, J=12.0 Hz, 1H), 3.48 (d, J=11.3 Hz, 1H), 2.69-2.64 (m, 1H), 1.01 (d, J=6.7 Hz, 6H), 0.78 (s, 9H), 0.01 (d, J=7.2 Hz, 6H). LC-MS (M+H)$^+$=469.9.

Step 5 (Compound 2-5): N-(9-((3R,4S,6R,7R)-1,1-difluoro-4-(((3-methoxyphenyl)(4-methoxyphenyl)(phenyl)methoxy)methyl)-7-(((2S,3aR,6S,7aR)-3a-methyl-6-(prop-1-en-2-yl)-2-sulfidohexahydrobenzo[d][1,3,2]oxathiaphosphol-2-yl)oxy)-5-oxaspiro[2.4]heptan-6-yl)-9H-purin-6-yl)benzamide

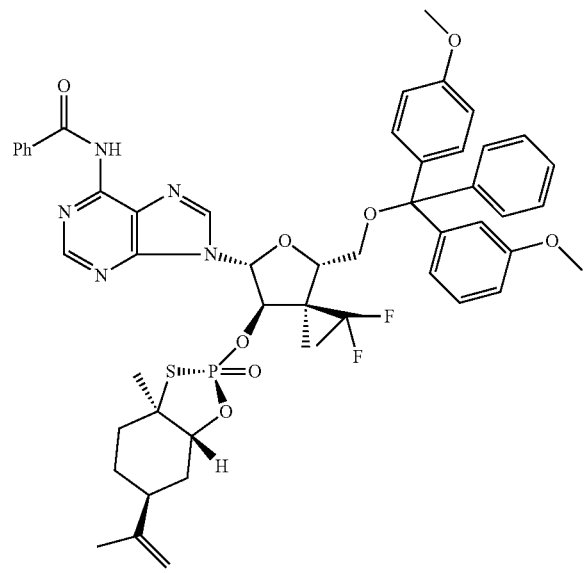 [SMILES: C=C(C)[C@H]1CC[C@@]2(C)S[P@@](=O)(O[C@H]3[C@H](n4cnc5c(NC(=O)c6ccccc6)ncnc54)O[C@H](COC(c4ccccc4)(c4ccc(OC)cc4)c4cccc(OC)c4)[C@@]3(C)C(C)(F)F)O[C@@H]2C1]

To a solution of N-(9-((3S,4S,6R,7R)-4-((bis(4-methoxyphenyl)(phenyl)methoxy)methyl)-1,1-difluoro-7-hydroxy-5-oxaspiro[2.4]heptan-6-yl)-9H-purin-6-yl)benzamide (1.4 g, 1.94 mmol) and (2R,3aR,6S,7aR)-3a-methyl-2-((perfluorophenyl)thio)-6-(prop-1-en-2-yl)hexahydrobenzo[d][1,3,2]oxathiaphosphole 2-sulfide (1.13 g, 2.53 mmol) in anhydrous acetonitrile (20 mL) under nitrogen was added a solution of 1,8-diazabicyclo[5.4.0]undec-7-ene (385 mg, 2.53 mmol) in anhydrous acetonitrile (1 mL) dropwise. The mixture was stirred at room temperature for 3 h. The mixture was filtered through a silica pad (40 mL) and washed with ethyl acetate/dichloromethane (100 mL, v/v=1/1). The filtrate was concentrated to give the title compound (1.7 g, 91%). $^1$H NMR (400 MHz, DMSO-d6) δ 11.25 (s, 1H), 8.73 (s, 1H), 8.55 (s, 1H), 8.04 (d, J=7.3 Hz, 2H), 7.65 (t, J=7.4 Hz, 1H), 7.55 (t, J=7.6 Hz, 2H), 7.27-7.17 (m, 5H), 7.17-7.05 (m, 4H), 6.79 (t, J=9.2 Hz, 4H), 6.55 (d, J=1.3 Hz, 1H), 6.08 (d, J=13.3 Hz, 1H), 4.92 (s, 1H), 4.83 (s, 1H), 4.70 (s, 1H), 4.34 (d, J=12.5 Hz, 1H), 3.70 (s, 6H), 3.17-3.09 (m, 1H), 2.98-2.94 (m, 1H), 2.14-2.11 (m, 1H), 2.02-1.91 (m, 4H), 1.89-1.73 (m, 4H), 1.69 (s, 3H), 1.59 (s, 3H). LC-MS (M+H)$^+$=965.7.

Step 6 (Compound 2-6): O-((3R,4S,6R,7R)-6-(6-benzamido-9H-purin-9-yl)-1,1-difluoro-4-(hydroxymethyl)-5-oxaspiro[2.4]heptan-7-yl) O-(((2R,3R,4R,5R)-4-fluoro-3-hydroxy-5-(2-isobutyramido-6-oxo-1,6-dihydro-9H-purin-9-yl)tetrahydrofuran-2-yl)methyl) O-hydrogen (R)-phosphorothioate

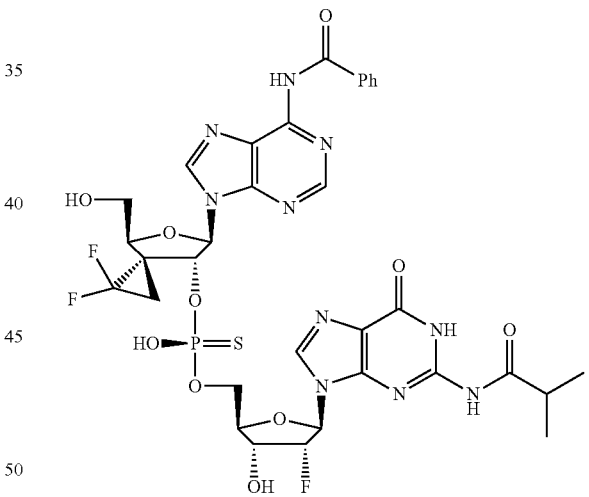

To a solution of N-(9-((3R,4S,6R,7R)-1,1-difluoro-4-(((3-methoxyphenyl)(4-methoxyphenyl)(phenyl)methoxy)methyl)-7-(((2S,3aR,6S,7aR)-3a-methyl-6-(prop-1-en-2-yl)-2-sulfidohexahydrobenzo[d][1,3,2]oxathiaphosphol-2-yl)oxy)-5-oxaspiro[2.4]heptan-6-yl)-9H-purin-6-yl)benzamide (200 mg, 0.21 mmol) and N-(9-((2R,3R,4R,5R)-4-((tert-butyldimethylsilyl)oxy)-3-fluoro-5-(hydroxymethyl)tetrahydrofuran-2-yl)-6-oxo-6,9-dihydro-1H-purin-2-yl)isobutyramide (146 mg, 0.31 mmol) in anhydrous acetonitrile (8 mL) under nitrogen was added a solution of 1,8-diazabicyclo[5.4.0]undec-7-ene (94 mg, 0.62 mmol) in anhydrous acetonitrile (0.5 mL) dropwise and the mixture was stirred at room temperature for 3 h. The mixture was concentrated and the residue was dissolved in acetonitrile (2 mL). To the solution was added triethylamine trihydrofluoride (0.5 mL) and the mixture was stirred at 50° C. overnight. After addition of a saturated aqueous solution of NaHCO₃, the solvent was evaporated under vacuum. The residue was purified by C18 column chromatography (Acetonitrile/water with 0.1% NH₄HCO₃=0% to 50%) to give the title compound (70 mg, 39%). ¹H NMR (400 MHz, DMSO-d6) δ 8.72 (s, 1H), 8.58 (s, 1H), 8.24 (s, 1H), 8.04 (d, J=7.3 Hz, 2H), 7.64 (t, J=7.3 Hz, 1H), 7.54 (t, J=7.6 Hz, 2H), 6.57 (d, J=2.6 Hz, 1H), 6.08 (dd, J=12.7, 5.7 Hz, 1H), 5.89-5.63 (m, 2H), 5.52 (d, J=9.5 Hz, 1H), 5.10 (t, J=5.5 Hz, 1H), 4.42 (s, 2H), 4.05-3.95 (m, 1H), 3.83-3.70 (m, 1H), 3.43-3.36 (m, 1H), 2.77 (dt, J=13.6, 6.8 Hz, 1H), 2.46-2.31 (m, 1H), 2.06-1.97 (m, 1H), 1.11 (d, J=6.8 Hz, 4H), 1.02 (d, J=6.8 Hz, 3H). LC-MS (M+H)⁺=850.6.

Step 7 (Compound 2-7): N-(9-((1R,5'S,7'R,8'R, 10'R,12a'R,14'R,15'R,15a'R)-2,2,15'-trifluoro-2',10'-dihydroxy-14'-(2-isobutyramido-6-oxo-1,6-dihydro-9H-purin-9-yl)-2',10'-disulfidooctahydro-12'H-spiro [cyclopropane-1,16'-[5,8]methanofuro[3,2-1][1,3,6, 9,11]pentaoxa[2,10]diphosphacyclotetradecin]-7'-yl)-9H-purin-6-yl)benzamide

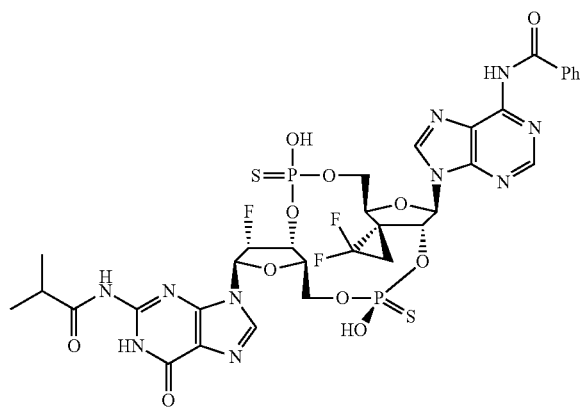 [SMILES: CC(C)C(=O)Nc1nc2c(ncn2[C@@H]2O[C@@H]3CO[P@@](O)(=S)O[C@H]4[C@H](n5cnc6c(NC(=O)c7ccccc7)ncnc65)O[C@H](COP(O)(=S)O[C@H]3[C@H]2F)[C@]42CC2(F)F)c(=O)[nH]1]

To a solution of O4(3R,4S,6R,7R)-6-(6-benzamido-9H-purin-9-yl)-1,1-difluoro-4-(hydroxymethyl)-5-oxaspiro[2.4] heptan-7-yl) O-(((2R,3R,4R,5R)-4-fluoro-3-hydroxy-5-(2-isobutyramido-6-oxo-1,6-dihydro-9H-purin-9-yl) tetrahydrofuran-2-yl)methyl) O-hydrogen (R)-phosphorothioate (70 mg, 0.082 mmol) in anhydrous pyridine (8 mL) treated with 4 Å molecular sieve under nitrogen was added biphenyl phosphite (19 mg, 0.082 mmol) and the mixture was stirred at room temperature for 3 h. 3H-1,2-benzodithiol-3-one (33 mg, 0.20 mmol) was added and the mixture was stirred for 30 minutes. After completed, the mixture was filtered and the filtrate was concentrated to give the title compound (crude) which was used directly in step 2-4. LC-MS (M+H)⁺=928.5.

Step 8 (Example 2): 2-amino-9-((1R,5'S,7'R,8'R, 10'R,12a'R,14'R,15'R,15a'R)-7'-(6-amino-9H-purin-9-yl)-2,2,15'-trifluoro-2',10'-dihydroxy-2',10'-disulfidooctahydro-12'H-spiro[cyclopropane-1,16'-[5,8] methanofuro[3,2-1][1,3,6,9,11]pentaoxa[2,10] diphosphacyclotetradecin]-14'-yl)-1,9-dihydro-6H-purin-6-one

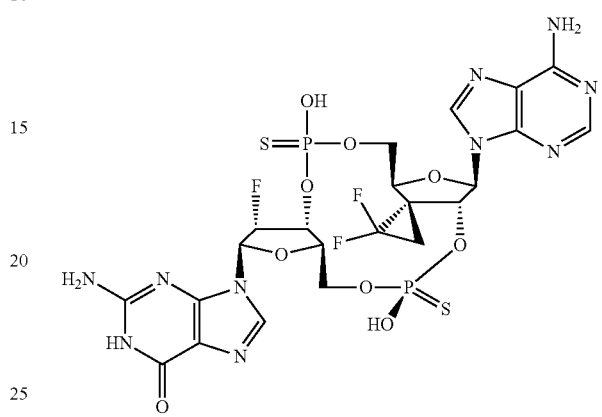

To a solution of N-(94(1R,5'S,7'R,8'R,10'R,12a'R,14'R, 15'R,15a'R)-2,2,15'-trifluoro-2',10'-dihydroxy-14'-(2-isobutyramido-6-oxo-1,6-dihydro-9H-purin-9-yl)-2',10'-disulfidooctahydro-12'H-spiro[cyclopropane-1,16'-[5,8] methanofuro[3,2-1][1,3,6,9,11]pentaoxa[2,10]diphosphacyclotetradecin]-7'-yl)-9H-purin-6-yl)benzamide (crude, 0.082 mmol) in anhydrous acetonitrile (0.5 mL) was added a solution of methylamine in ethanol (33%, 0.5 mL), and the mixture was stirred at room temperature overnight. Tert-butyl methyl ether (3 mL) was added and the precipitate was collected by filtration, which was purified by prep-HPLC to give Example 2 (7.6 mg, 12% over 2 steps). ¹H NMR (400 MHz, D₂O) δ 8.81 (s, 1H), 8.29 (s, 1H), 7.91 (s, 1H), 6.30-6.16 (m, 2H), 5.91-5.77 (m, 1H), 5.60-5.58 (m, 1H), 5.11-5.08 (m, 1H), 4.51-4.48 (m, 2H), 4.42-4.35 (m, 1H), 4.24-4.22 (m, 1H), 4.15-4.11 (m, 1H), 3.93 (d, J=11.3 Hz, 1H), 2.14-2.07 (m, 1H), 1.84-1.79 (m, 1H). LC-MS (M+H)⁺ =755.5.

Biological Activity

STING Cellular Assay in THP1-Dual™ Cells

Materials

THP1-Dual™ cells were derived from the human THP-1 monocyte cell line by stable integration of two inducible reporter constructs. THP1-Dual™ cells feature the Lucia luciferase gene, a new secreted luciferase reporter gene, under the control of an ISG54 (interferon-stimulated gene) minimal promoter in conjunction with five interferon (IFN)-stimulated response elements. THP1-Dual™ cells also express a secreted embryonic alkaline phosphatase (SEAP) reporter gene driven by an IFN-β minimal promoter fused to five copies of the NF-κB consensus transcriptional response element and three copies of the c-Rel binding site. As a result, THP1-Dual™ cells allow the simultaneous study of the NF-κB pathway, by monitoring the activity of SEAP, and the interferon regulatory factor (IRF) pathway, by assessing the activity of Lucia luciferase. Both reporter proteins are readily measurable in the cell culture supernatant when using QUANTI-Blue™, a SEAP detection reagent, and QUANTI-Luc™, a Lucia luciferase detection reagent.

Distinct variants of human STING (hSTING) that affect CDN recognition and signal transduction have been identified:
R232 (R71-G230-R232-R293): the most prevalent in the human population (~60%). Referred as the "wild-type" or 232R-RGR allele2.
HAQ (H71-A230-R232-Q293): contains three non-synonymous single nucleotide substitutions; R71H, G230A and R293Q. This allele, found in ~20% of the population, is less sensitive to CDNs than the "wild-type" allele2.

Cell Maintenance

Growth Medium: RPMI 1640, 2 mM L-glutamine, 25 mM HEPES, 10% heat-inactivated fetal bovine serum (30 min at 56° C.), 100 µg/mL Normocin™, Pen-Strep (100 U/mL-100 µg/mL)

1. After cells have recovered (after at least one passage), maintain and subculture the cells in growth medium. (To maintain selection pressure, add 10 µg/mL of blasticidin and 100 µg/mL of Zeocin™ to the growth medium every other passage.)
2. Pass the cells every 3 days by inoculating $7 \times 10^5$ cells/mL. Do not allow the cell concentration to exceed $2 \times 10^6$ cells/mL.

Experimental Procedure

1. Add 180 µL of cell suspension (100,000 cells) per well of a flat-bottom 96-well plate (costar 3599).
2. Then add compounds with serial dilutions over 10 points with a 1 nM-10 µM final concentration range in 0.1% DMSO/growth medium.
3. Incubate the plate for 24 h at 37° C., 5% $CO_2$.
4. Set the BMG PHERAstar FSX instrument with the following parameters: 50 µL of injection, end-point measurement with a 4 second start time and 0.1 second reading time.
5. Pipet 10 µL of THP1-Dual™ cell culture medium per well into a 96-well white opaque plate (Corning 3903).
6. Add 50 µL of QUANTI-Luc assay solution to each well and gently tap the plate several times to mix. Proceed immediately with the measurement.

TABLE 1

Cellular activity $EC_{50}$ (nM) for the compounds disclosed herein

| Compound No. or Compound Name | Cellular activity $EC_{50}$ in THP1-Dual Cells/ THP1-Dual KI-hSTING-R232 Cells (nM) |
| --- | --- |
| 1 | 2685/3211 |
| 2 | 1758/2324 |
| 2',3'-cGAMP disodium salt | 5452/4725 |

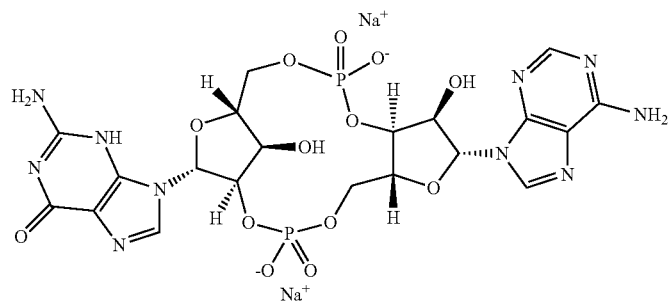

2',3'-cGAMP disodium salt

It is to be understood that, if any prior art publication is referred to herein; such reference does not constitute an admission that the publication forms a part of the common general knowledge in the art in any country.

The disclosures of all publications, patents, patent applications and published patent applications referred to herein by an identifying citation are hereby incorporated herein by reference in their entirety.

Although the foregoing invention has been described in some details by way of illustration and example for purposes of clarity of understanding, it is apparent to those skilled in the art that certain minor changes and modifications will be practiced. Therefore, the description and Examples should not be construed as limiting the scope of the invention.

What is claimed is:

1. A compound of formula (I):

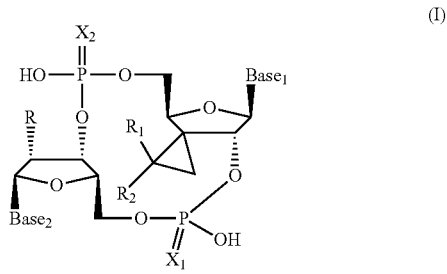

or a stereoisomer thereof, or a pharmaceutically acceptable salt thereof, wherein:

R is selected from halogen, —$C_{1-8}$alkyl, or —$OR^a$, wherein $R^a$ is hydrogen or —$C_{1-8}$alkyl;

$R_1$ and $R_2$ are F;

$X_1$ and $X_2$, which are the same or different, are each independently O or S; and $Base_1$ and $Base_2$, which are the same or different, are each independently

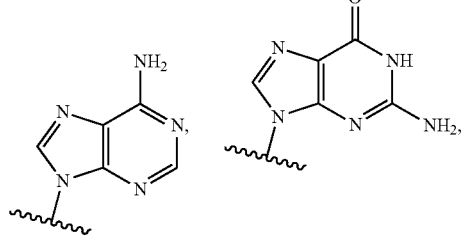
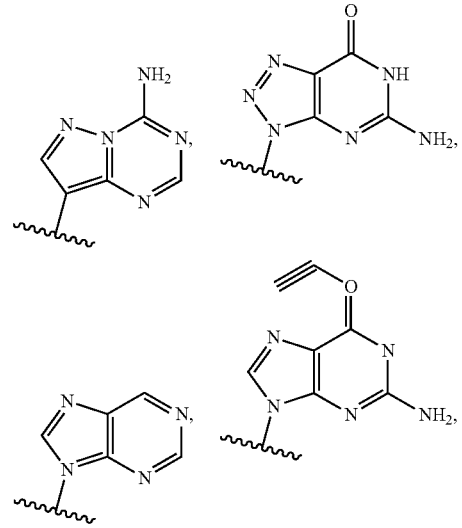
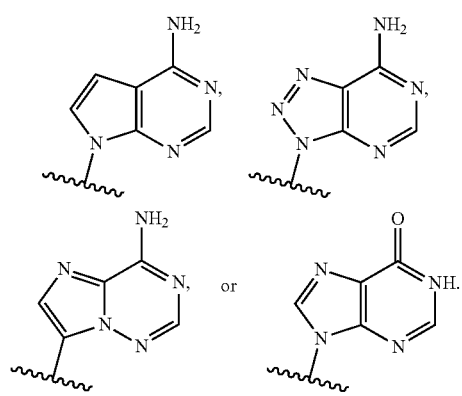
2. The compound of claim 1, wherein R is F, Cl, Br or I.
3. The compound of claim 1, wherein R is F or OH.
4. The compound according to claim 1, wherein $X_1$ and $X_2$ are both O or $X_1$ and $X_2$ are both S.
5. The compound of claim 1, wherein Base$_1$ is selected from
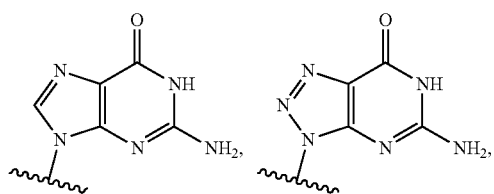
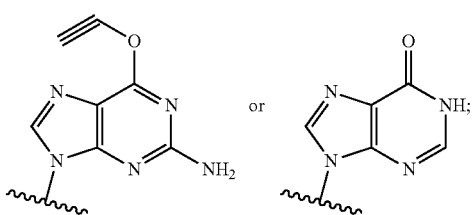
and Base$_2$ is selected from
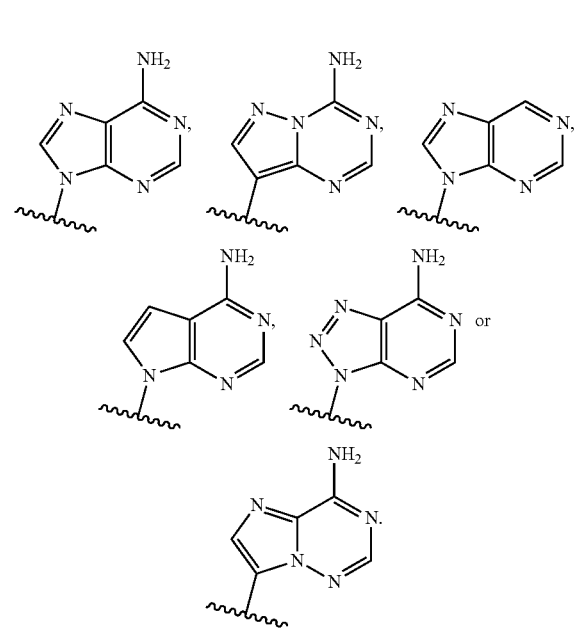
6. The compound of claim 1, wherein Base$_1$ is selected from
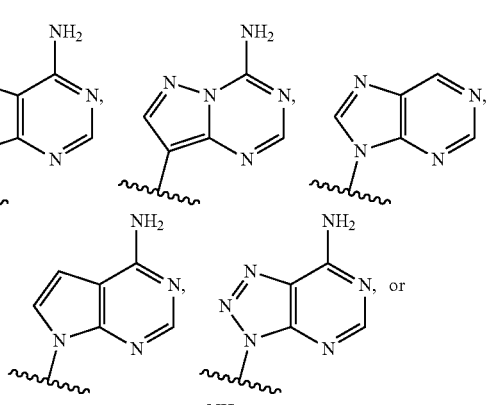
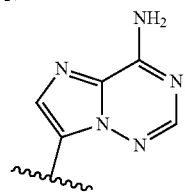
and Base₂ is selected from
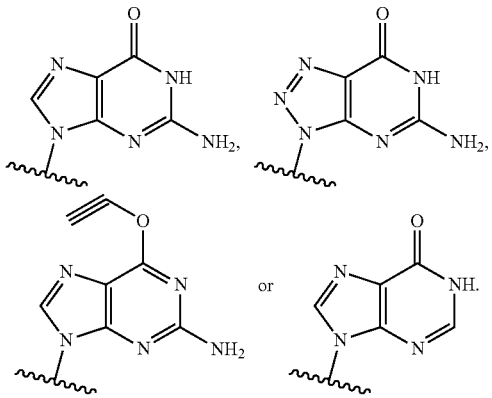
7. The compound according to claim 1, wherein the compound has the structure of Formula (Ia) or Formula (Ib)
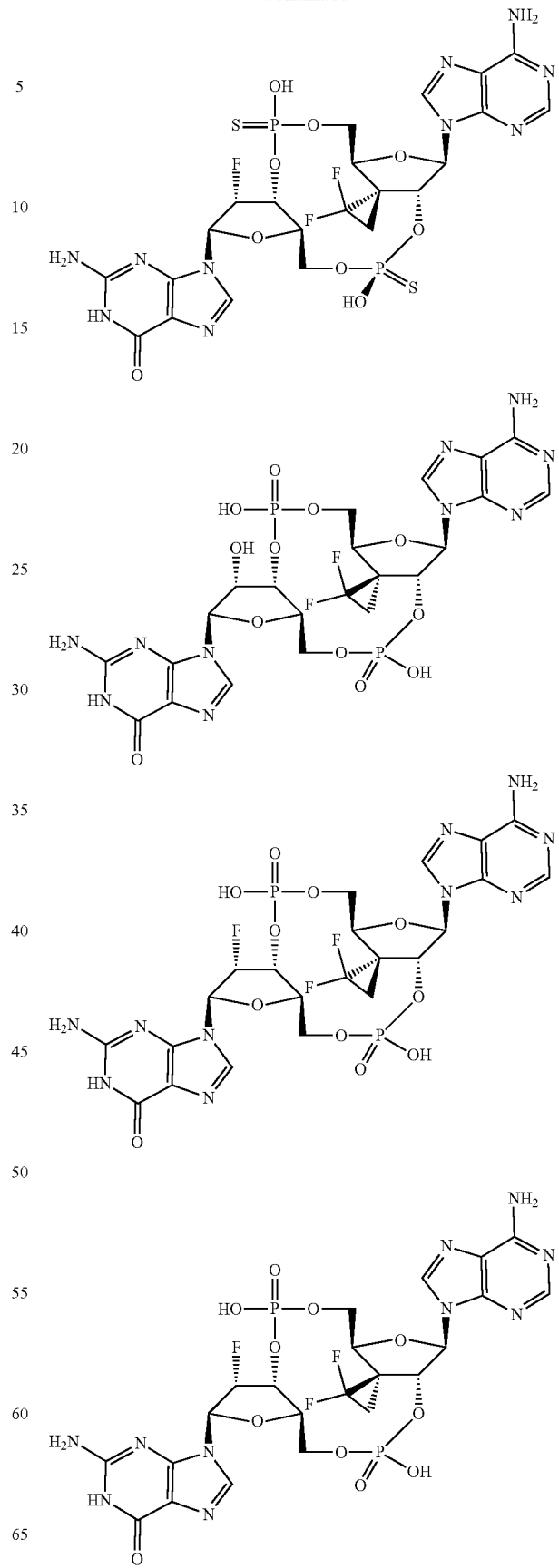
or a stereoisomer thereof, or a pharmaceutically acceptable salt thereof.
8. The compound of claim 1, wherein the compound is selected from:

51
-continued
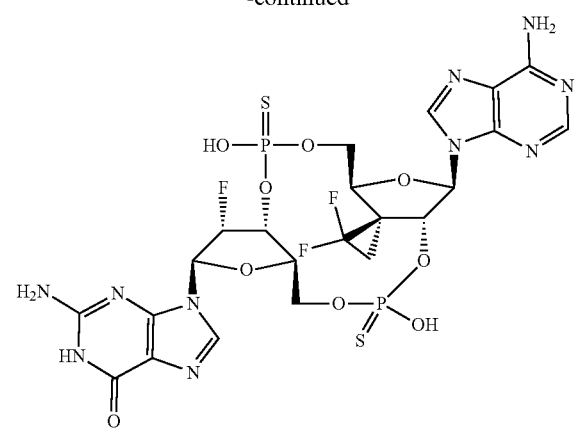
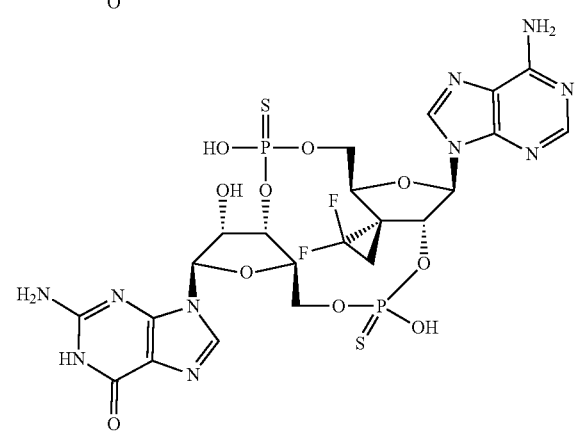
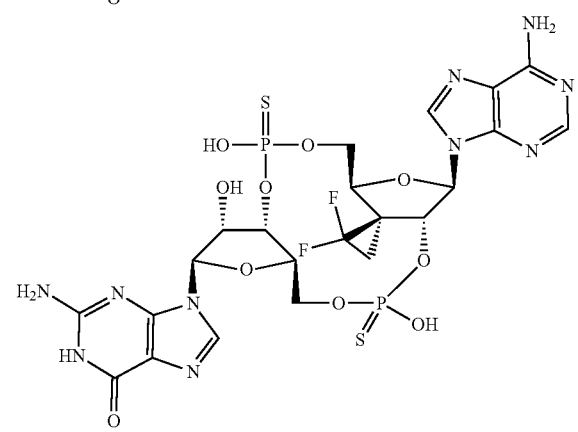
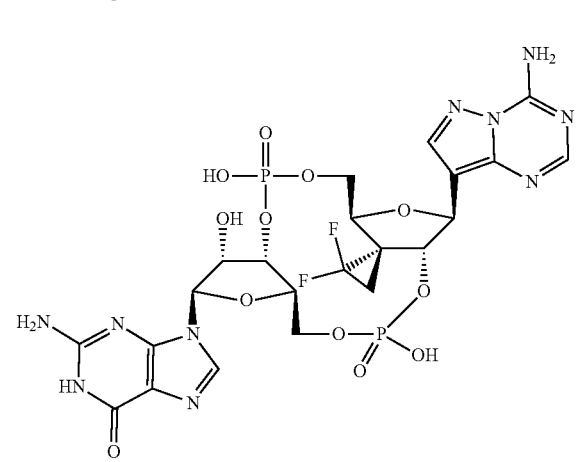
52
-continued
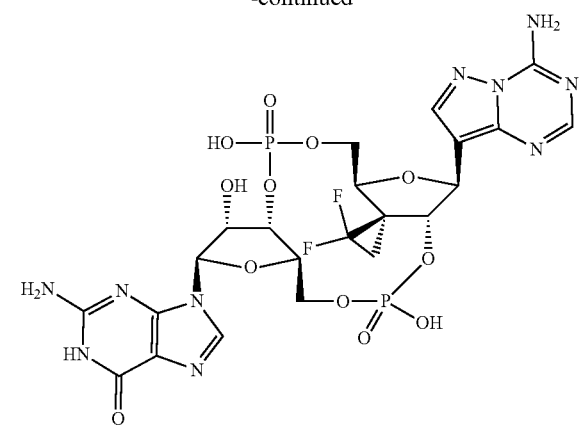
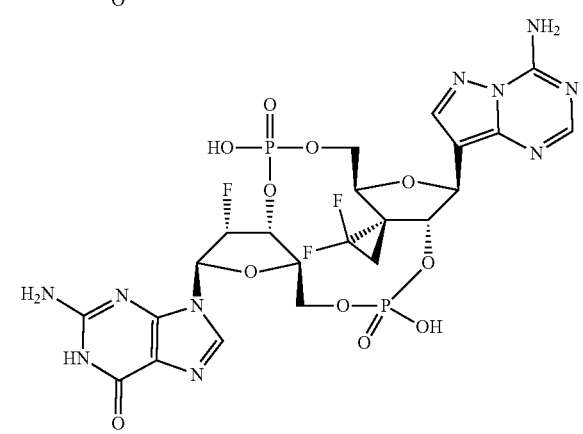
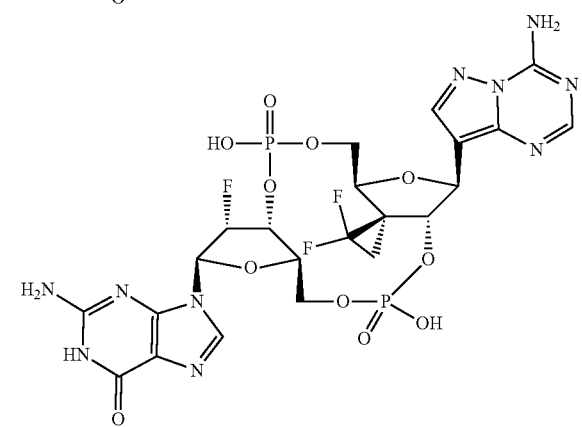
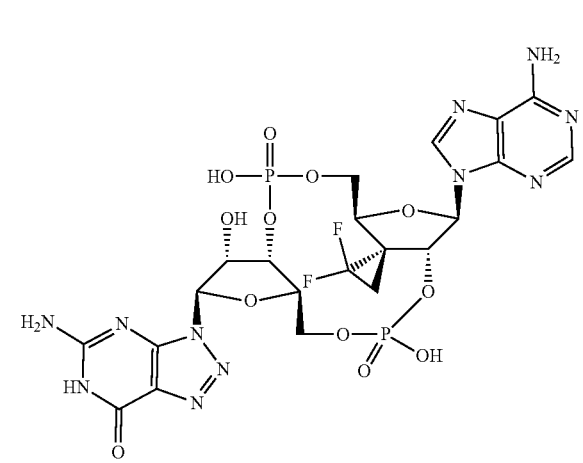

53
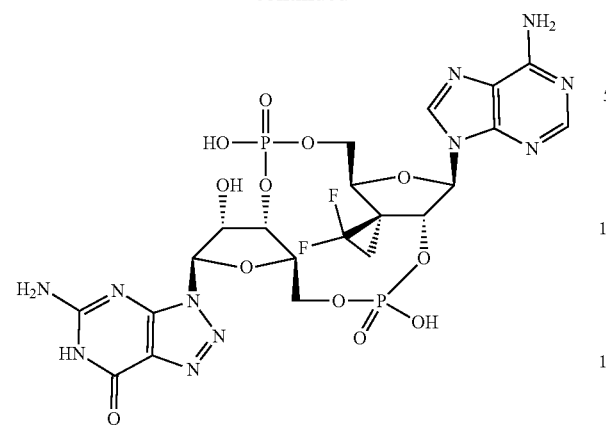
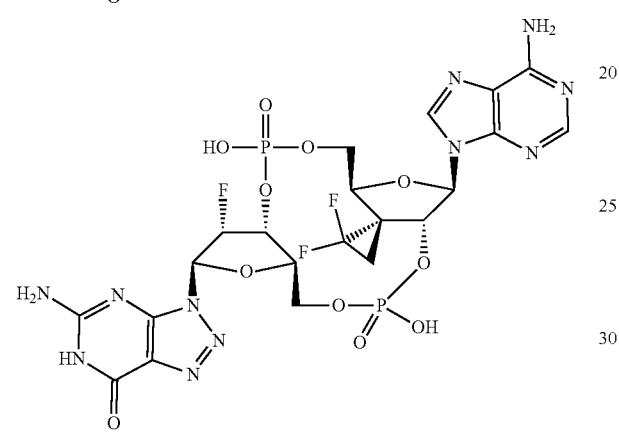
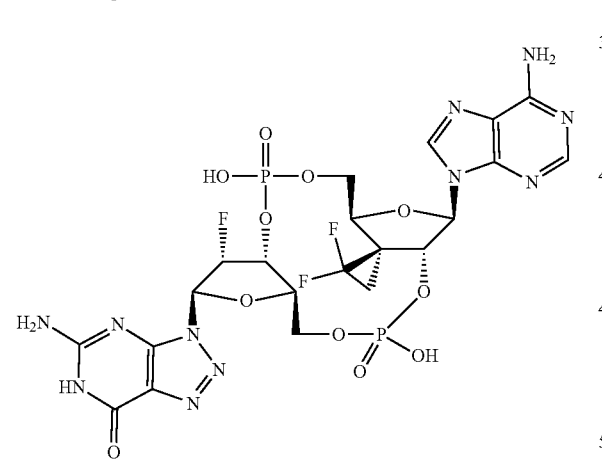
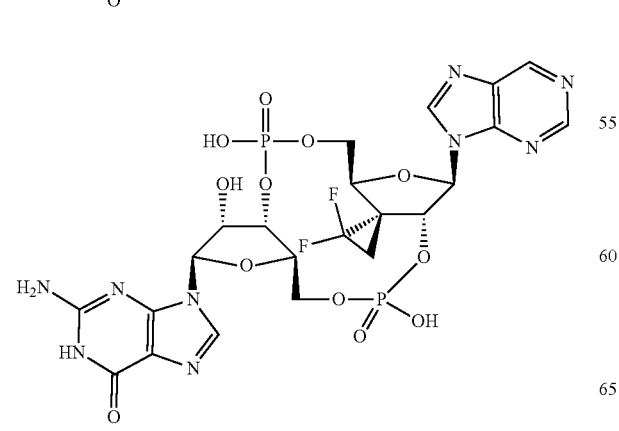
54
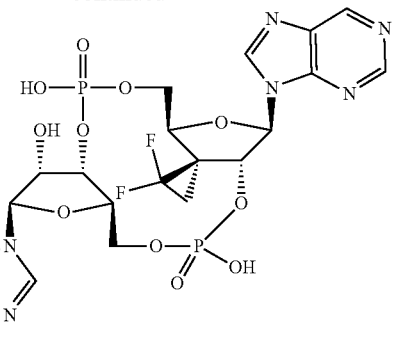
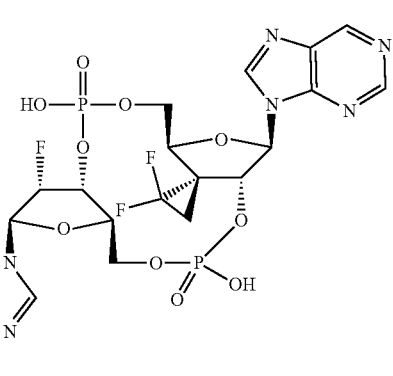
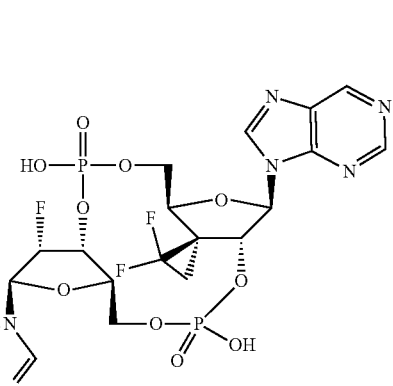
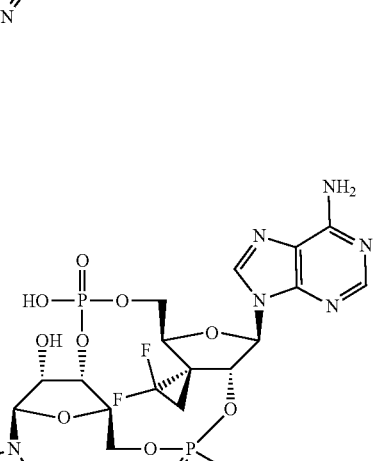

55
-continued
56
-continued
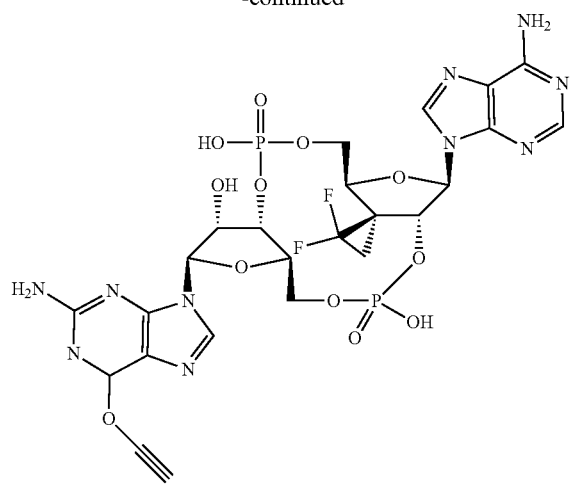
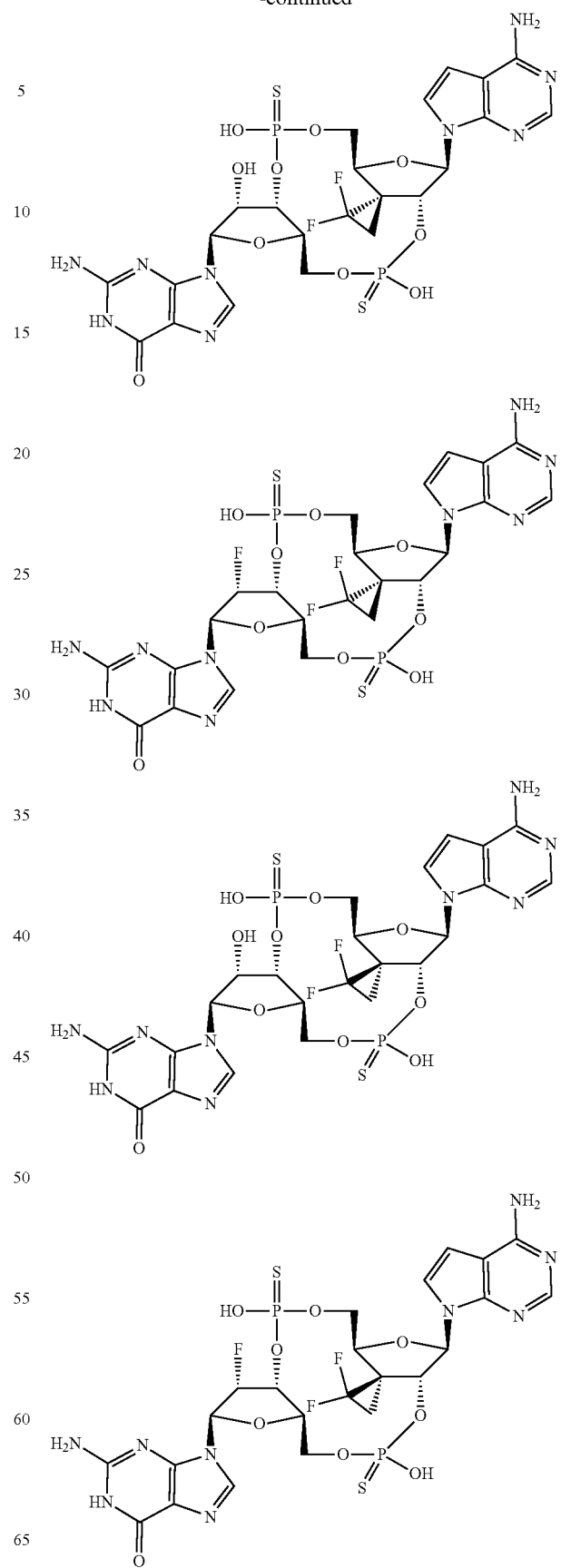

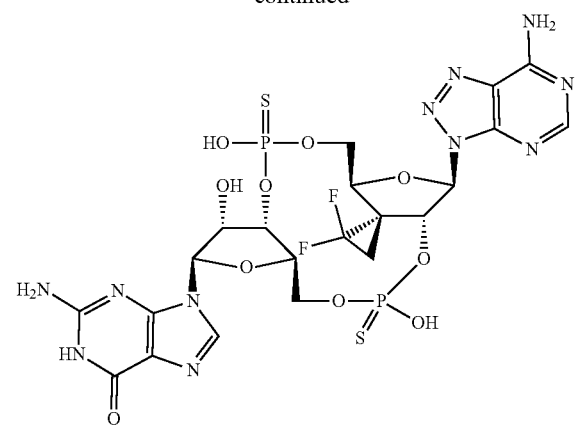
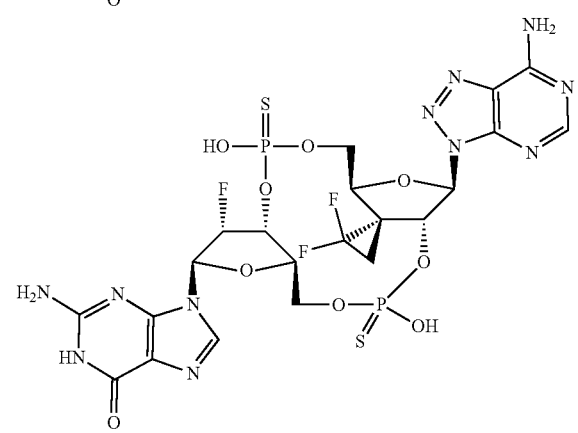
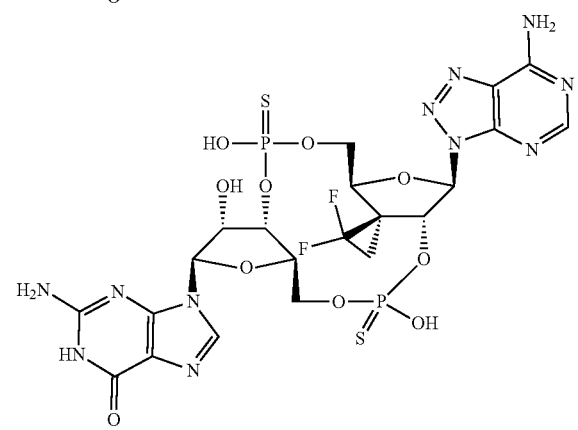
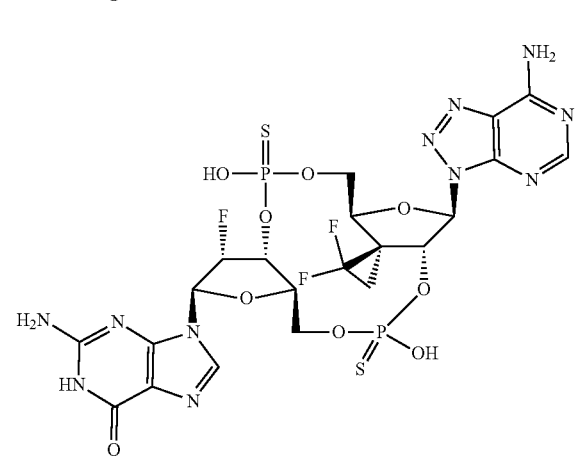
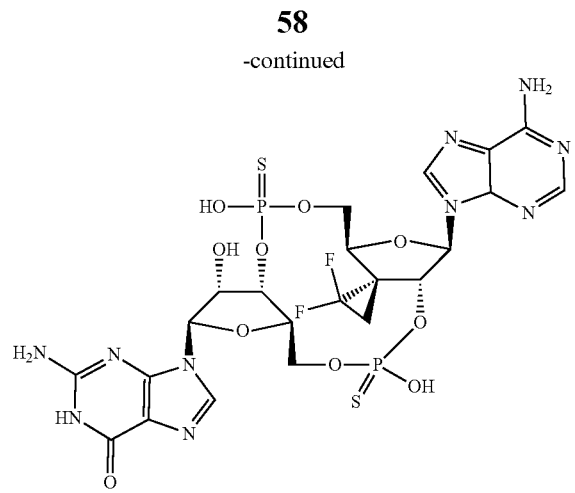
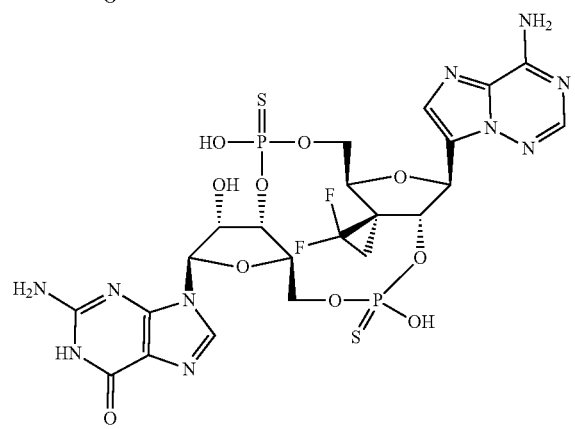
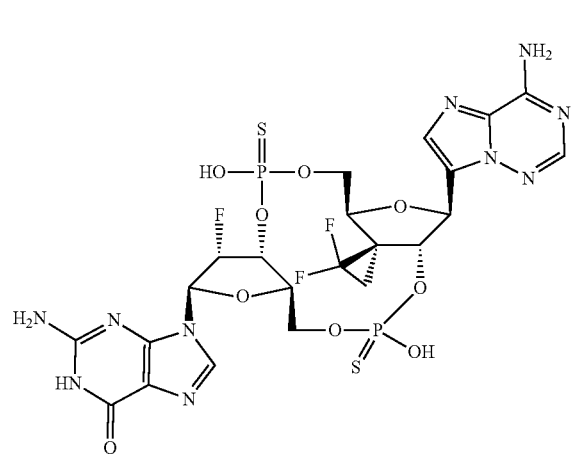

-continued
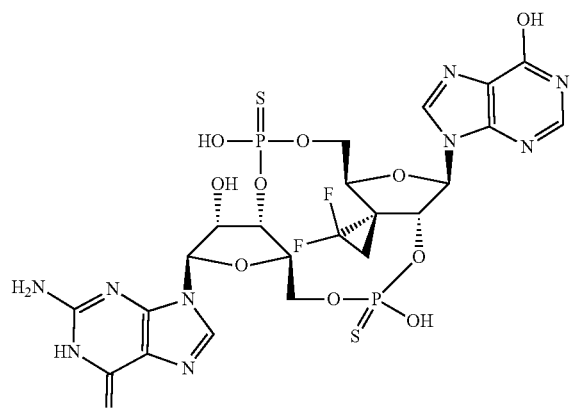
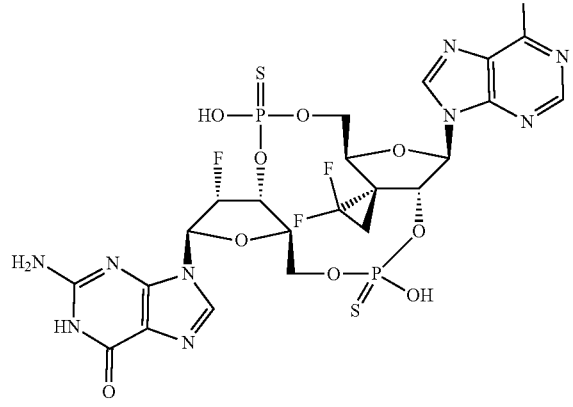
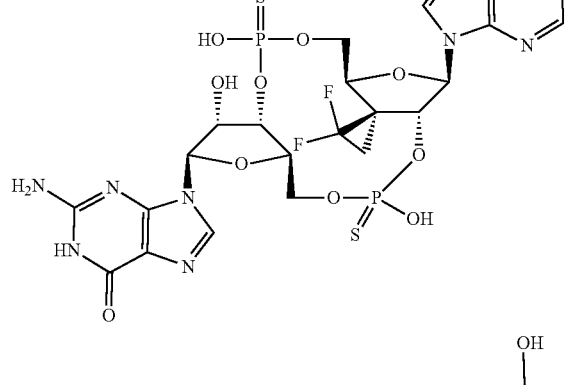
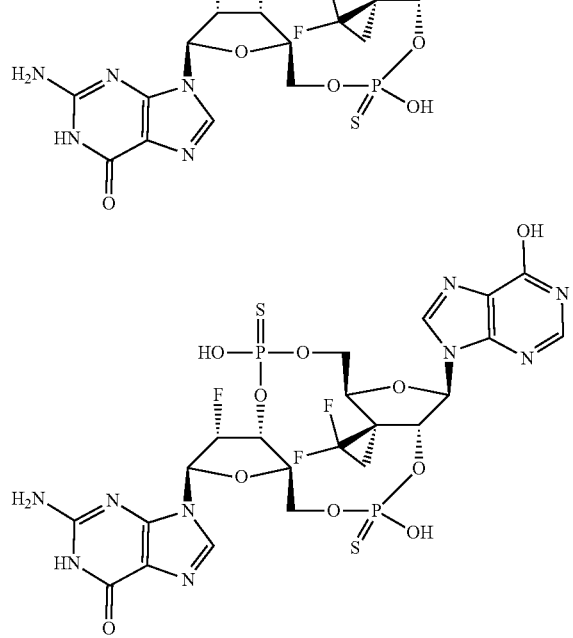
or a stereoisomer thereof, or a pharmaceutically acceptable salt thereof.
9. The compound of claim 1, wherein the compound is:
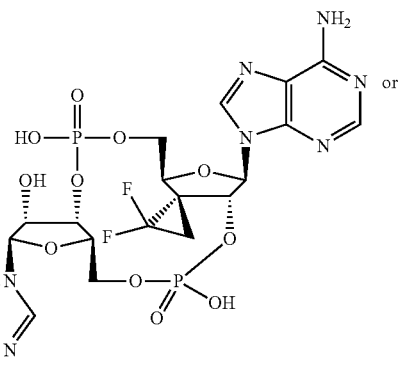 or
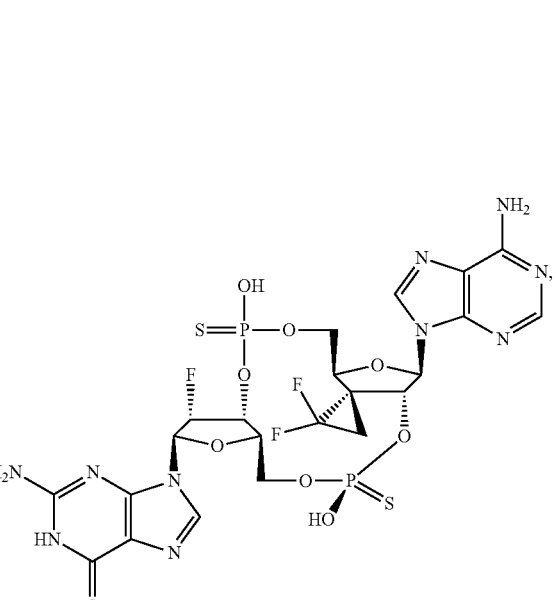
or a stereoisomer thereof, or a pharmaceutically acceptable salt thereof.
10. The compound of claim 8, wherein the compound is
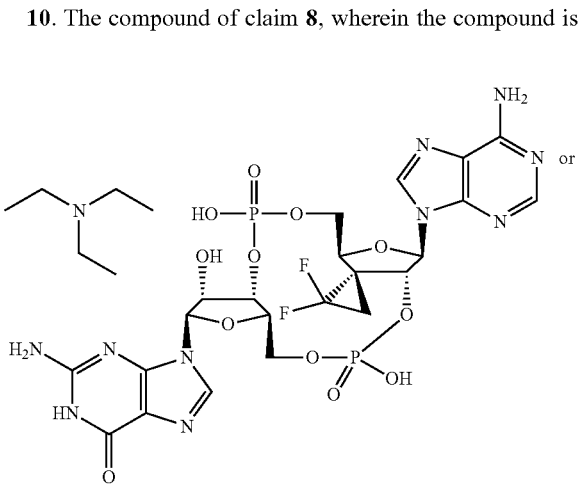 or -continued

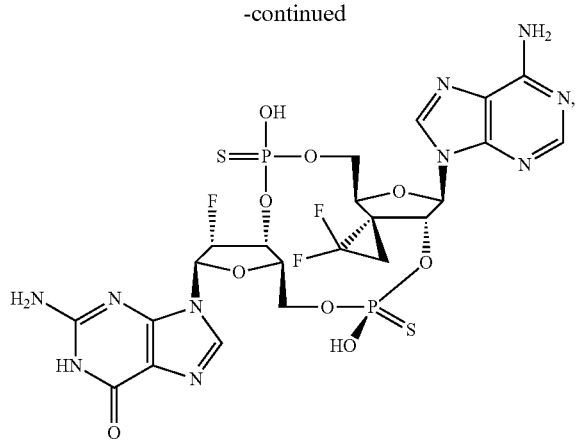

or a stereoisomer thereof.

11. A pharmaceutical composition comprising the compound of formula (I) or a stereoisomer thereof, or a pharmaceutically acceptable salt thereof according to claim 1.

12. A method of treating disease comprising administering a subject in need thereof the compound of formula (I) or a stereoisomer thereof, or a pharmaceutically acceptable salt thereof according to claim 1 in an effective amount to benefit the subject.

13. The method of claim 12, wherein the disease is selected from cancer, HIV infection or HBV infection.

14. The compound of claim 1, wherein

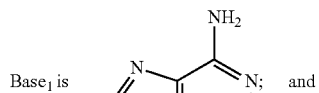

Base₁ is ; and

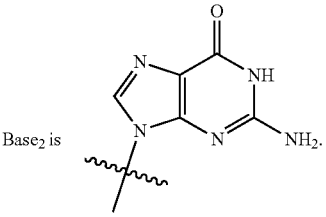

Base₂ is

15. The pharmaceutical composition of claim 11, wherein the composition further comprises a pharmaceutically acceptable excipient.

* * * * *